US010152697B2

(12) United States Patent
Hirahara

(10) Patent No.: US 10,152,697 B2
(45) Date of Patent: Dec. 11, 2018

(54) MONITORING APPARATUS, MONITORING METHOD AND NON-TRANSITORY COMPUTER-READABLE MEDIUM

(71) Applicant: CANON KABUSHIKI KAISHA, Tokyo (JP)

(72) Inventor: Akiko Hirahara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 697 days.

(21) Appl. No.: 14/496,470

(22) Filed: Sep. 25, 2014

(65) Prior Publication Data
US 2015/0106060 A1    Apr. 16, 2015

(30) Foreign Application Priority Data
Oct. 11, 2013 (JP) .................. 2013-214142

(51) Int. Cl.
*G06Q 10/00* (2012.01)
(52) U.S. Cl.
CPC ................. *G06Q 10/20* (2013.01)
(58) Field of Classification Search
CPC ... H04L 29/08072; H04L 29/06; H04L 43/00; H04L 12/2602; H04L 41/22; H04L 43/18; H05K 999/99; G06F 2201/86; G06F 11/3466; G06F 11/3636
USPC ........................................ 709/224
See application file for complete search history.

(56) References Cited

U.S. PATENT DOCUMENTS

| | | | | |
|---|---|---|---|---|
| 7,640,367 B2* | 12/2009 | Takamoto | .................. | G06F 8/65 710/10 |
| 8,804,168 B2* | 8/2014 | Nishikawa | ................ | G06F 8/65 358/1.13 |
| 2006/0044591 A1* | 3/2006 | Matsuzaki | ........... | G06K 15/005 358/1.14 |
| 2010/0325493 A1* | 12/2010 | Morimura | ........... | G06F 11/0709 714/39 |
| 2011/0002012 A1* | 1/2011 | Amagai | ........... | G06K 19/06046 358/3.28 |
| 2011/0055810 A1* | 3/2011 | DeHaan | .............. | G06F 21/6272 717/120 |

(Continued)

FOREIGN PATENT DOCUMENTS

JP    2011-135552 A    7/2011

*Primary Examiner* — Mahran Y Abu Roumi
(74) *Attorney, Agent, or Firm* — Carter, Deluca, Farrell & Schmidt, LLP

(57) ABSTRACT

A monitoring apparatus comprises: a processing unit that determines, if received type information of one or more other monitoring apparatuses does not match type information of the monitoring apparatus, one or more apparatuses that serve as monitoring targets of the monitoring apparatus from among a plurality of apparatuses that were being monitored by the one or more other monitoring apparatuses; a notification unit that notifies a management server of information on the one or more other monitoring apparatuses whose monitoring target was changed and of the type information of the monitoring apparatus; and a transmission unit that collects, after the notification unit made notification, operation information on the one or more apparatuses that were determined by the processing unit as monitoring targets of the monitoring apparatus, and transmits the collected operation information to the management server.

9 Claims, 22 Drawing Sheets

(56) References Cited

U.S. PATENT DOCUMENTS

2012/0143930 A1* 6/2012 Cho ................. G06F 17/30194
                                                707/827
2012/0317277 A1* 12/2012 Hirahara ............. G06F 11/3065
                                                709/224

* cited by examiner

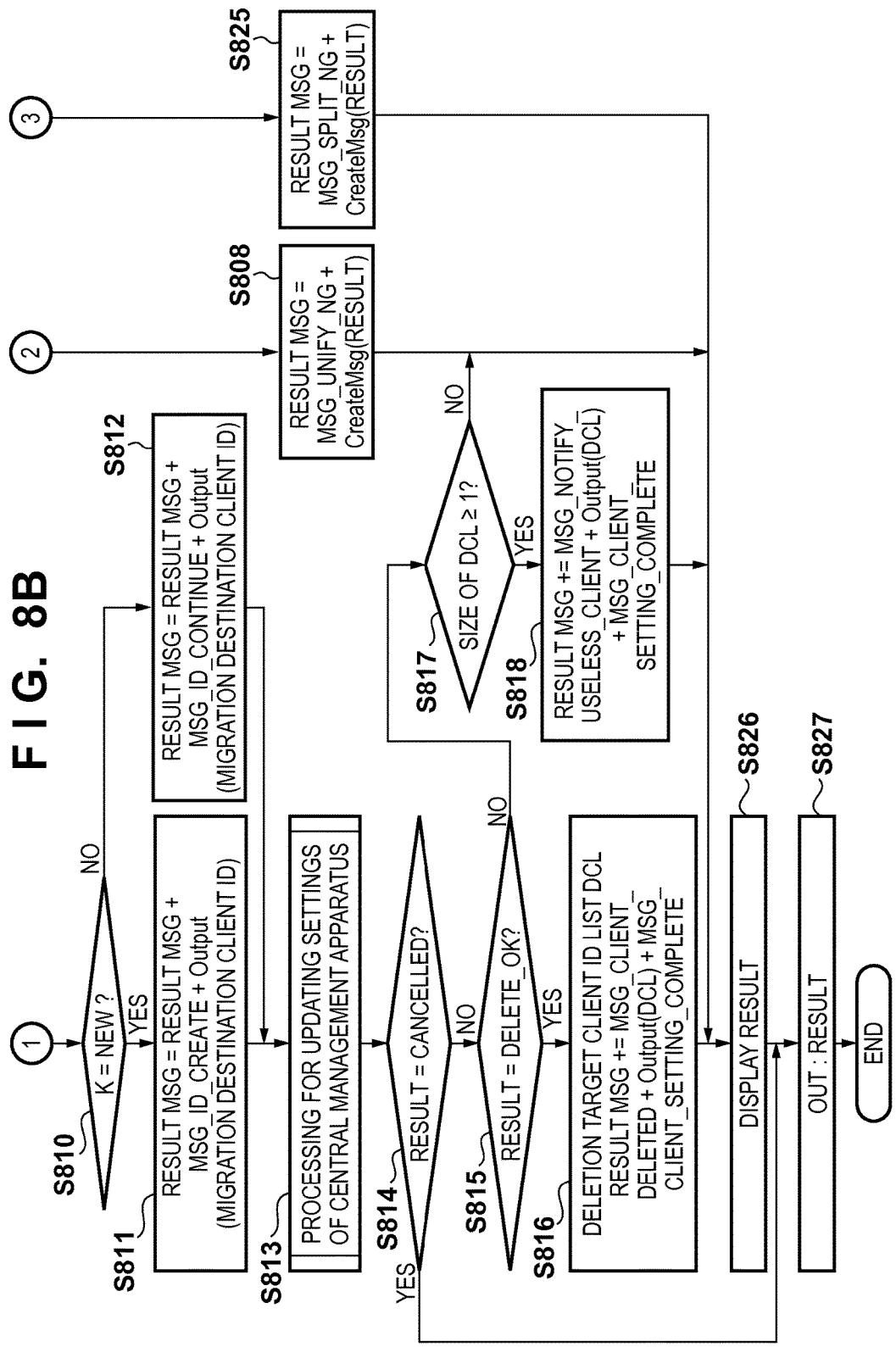

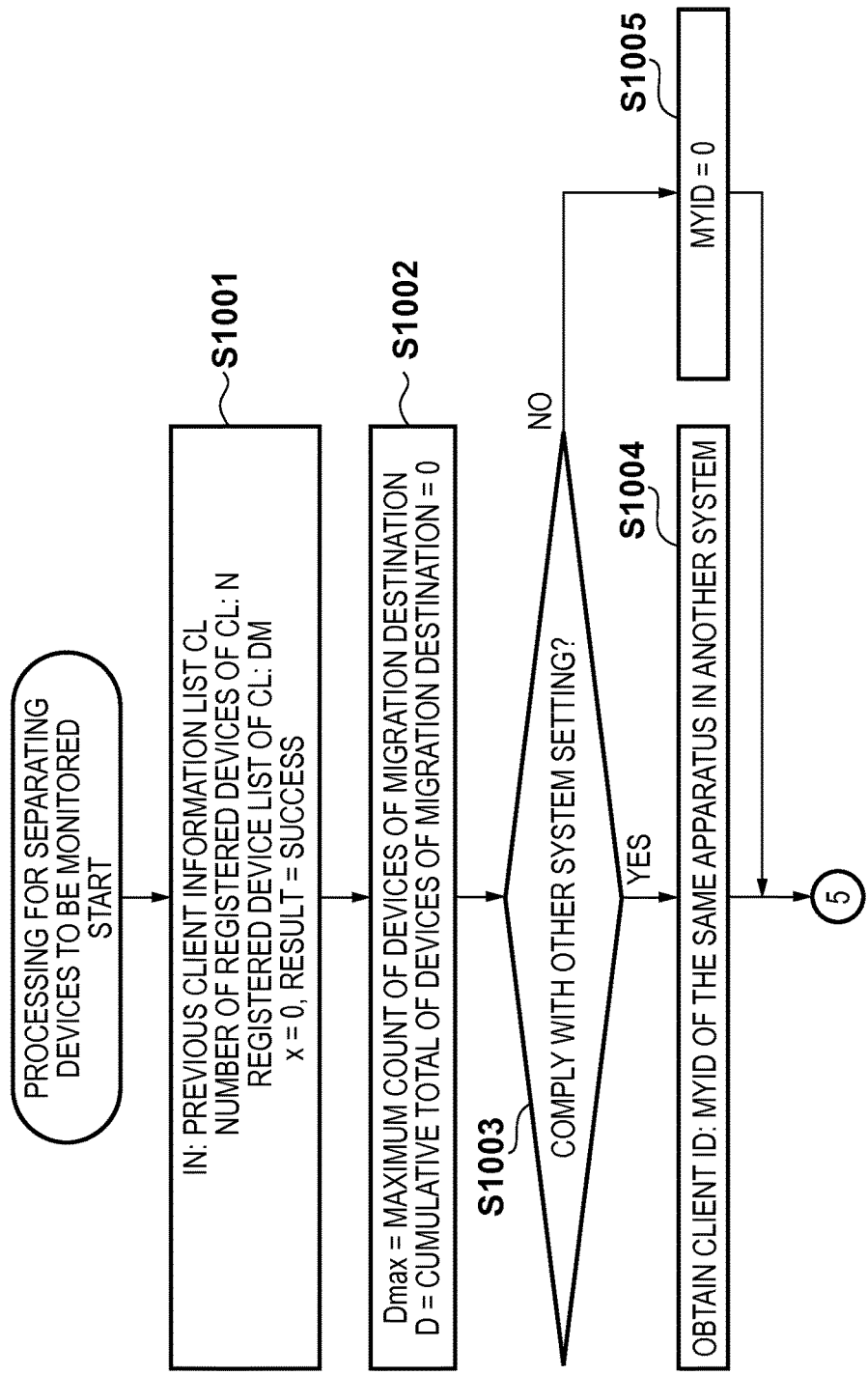

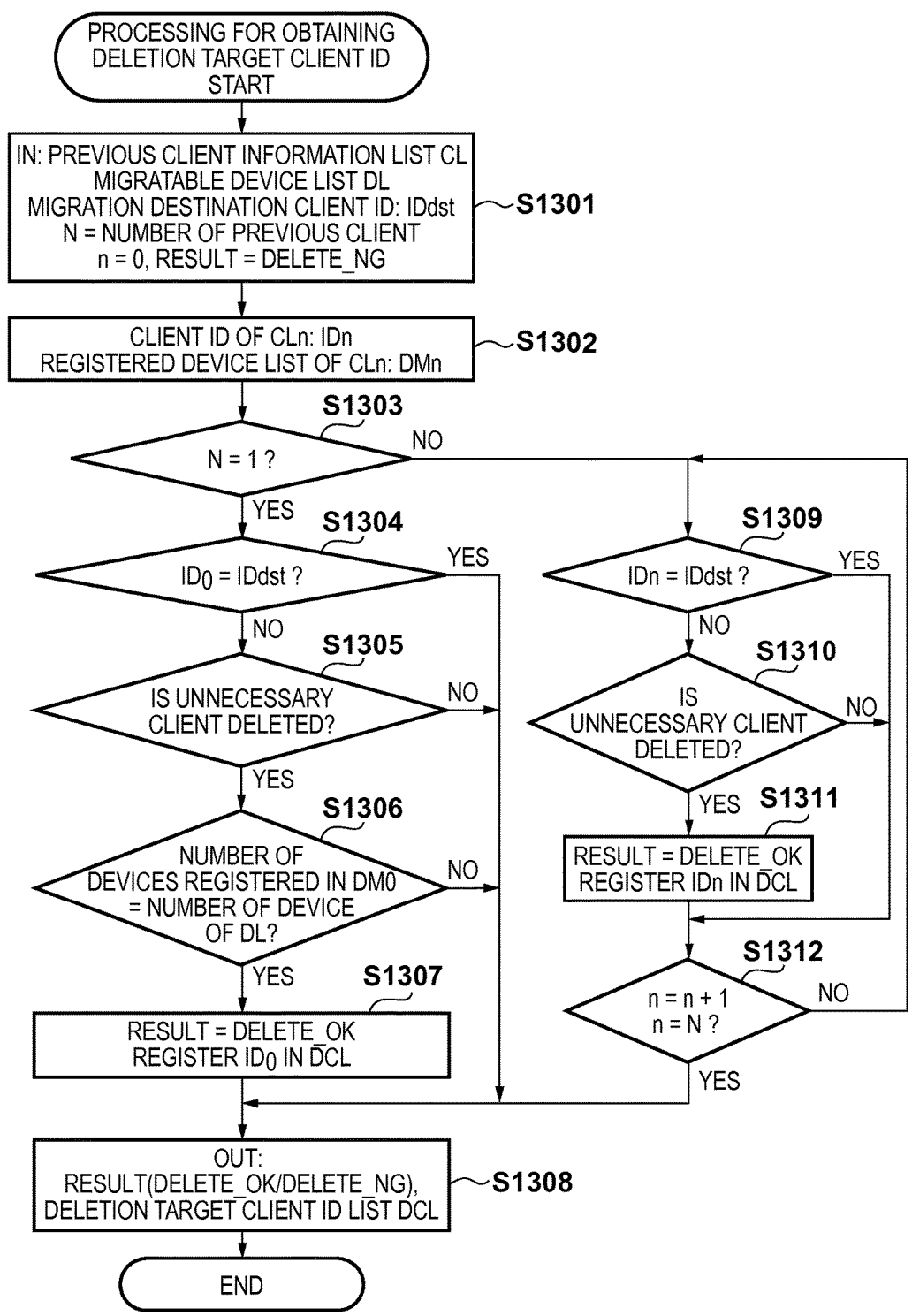

F I G. 14

| MESSAGE ID | CONTENT OF MESSAGE |
|---|---|
| MSG_UNIFY_OK | "DESIGNATED CLIENT IDS CAN BE INTEGRATED AND MONITORED BY PRESENT MONITORING APPARATUS.¥n" |
| MSG_NO_SPLIT | "DESIGNATED CLIENT IDS CAN BE MONITORED BY PRESENT MONITORING APPARATUS.¥n" |
| MSG_PARTIAL_UNIFY | "SOME OF DESIGNATED CLIENT ARE NON-MIGRATABLE FOR FOLLOWING REASON. ¥n PLEASE PLACE ANOTHER MONITORING APPARATUS AND PERFORM AGAIN MIGRATION PROCESSING.¥n" |
| MSG_SPLIT_DEVICE | "SOME OF DEVICES CANNOT BE MONITORED BY PRESENT MONITORING APPARATUS FOR FOLLOWING REASONS. ¥n PLEASE PLACE ANOTHER MONITORING APPARATUS AND PERFORM AGAIN MIGRATION PROCESSING WITH DESIGNATED CLIENT ID.¥n" |
| MSG_ID_CREATE | "CREATE CLIENT ID OF PRESENT MONITORING APPARATUS. ¥n¥t MIGRATION DESTINATION CLIENT ID." |
| MSG_ID_CONTINUE | "DESIGNATED ID IS CONTINUOUSLY USED FOR CLIENT ID OF PRESENT MONITORING APPARATUS. ¥n¥t MIGRATION DESTINATION CLIENT ID." |
| MSG_INVALID_CLIENT | "FOLLOWINGS ARE CLIENTS THAT CANNOT BE MONITORED BY PRESENT MONITORING APPARATUS.¥n" |
| MSG_UNABLE_DEVICE | "FOLLOWINGS ARE DEVICES THAT CANNOT BE MONITORED BY PRESENT MONITORING APPARATUS.¥n" |
| MSG_NOTIFY_DELETE_CLIENT | "UNNECESSARY CLIENT WILL BE DELETED. ¥n¥t DELETION TARGET CLIENT ID." |
| MSG_CLIENT_DELETED | "UNNECESSARY CLIENT WAS DELETED. ¥n¥t DELETED CLIENT ID." |
| MSG_NOTIFY_USELESS_CLIENT | "FOLLOWING CLIENT IS UNNECESSARY. PLEASE PERFORM DELETION PROCESSING AS NEEDED. ¥n¥t UNNECESSARY CLIENT ID." |
| MSG_CONFIRMATION | "CLIENT MIGRATION PROCESSING WILL BE PERFORMED WITH SETTING ABOVE. ¥n IF MIGRATION DESTINATION CLIENT ID SHOULD BE CHANGED, PLEASE INPUT DESIRED ID.¥n" |
| MSG_CLIENT_SETTING_COMPLETE | "MIGRATION PROCESSING IS COMPLETED. ¥n¥t MIGRATION DESTINATION CLIENT ID." |
| CreateMsg(RESULT) | Append((RESULT&EXCESS_DEVICE ? "¥t¥t: RESTRICTION BY NUMBER OF SUPPORTED DEVICES¥n" : ""),<br>(RESULT&COM_ERR ? "¥t¥t: COMMUNICATION WITH DEVICE IS NOT POSSIBLE ¥n" : ""),<br>(RESULT&OTHER_SYSTEM_MANAGED ? "¥t¥t: TARGET OF SEPARATION AND MONITORING BY ANOTHER SYSTEM ¥n" : "")) |

DEFAULT SETTING

PLEASE INPUT ACCOUNT TO CONNECT TO CENTRAL MANAGEMENT APPARATUS, AND CLIENT ID OF PREVIOUS MONITORING APPARATUS

USER NAME    [   ] ~1502

PASSWORD    [   ] ~1503

CLIENT ID    [   ] ~1504

[ CONNECTION TEST ] [ CANCEL ]

F I G. 16B

| CONFIRMATION OF CLIENT MIGRATION |
|---|

SOME OF DEVICES CANNOT BE MONITORED BY PRESENT MONITORING APPARATUS FOR FOLLOWING REASONS.
PLEASE PLACE ANOTHER MONITORING APPARATUS AND PERFORM AGAIN MIGRATION PROCESSING WITH DESIGNATED CLIENT ID.
 - RESTRICTION BY NUMBER OF SUPPORTED DEVICES
 - COMMUNICATION WITH DEVICE IS NOT POSSIBLE

FOLLOWINGS ARE DEVICES THAT CANNOT BE MONITORED BY PRESENT MONITORING APPARATUS.
 ABC002231, ABC002232, ABC002240, ABC002245, ABC002247,
 ABC002250, ABC002252, ABC002255, ABC002258, ABC002259,
 ABC002261, ABC002262, ABC002263, ABC002265

CREATE CLIENT ID OF PRESENT MONITORING APPARATUS.
 MIGRATION DESTINATION CLIENT ID: AAABB0001234

PERFORM CLIENT MIGRATION WITH SETTING ABOVE.
IF MIGRATION DESTINATION CLIENT ID SHOULD BE CHANGED, PLEASE INPUT DESIRED ID.

CHANGED CLIENT ID [_____] ~1603

[ PERFORM MIGRATION WITH SETTING ABOVE ]~1604   [ CANCEL ]

F I G. 17

COMPLETION OF CLIENT MIGRATION PROCESSING

SOME OF DEVICES CANNOT BE MONITORED BY PRESENT MONITORING APPARATUS FOR FOLLOWING REASONS.
PLEASE PLACE ANOTHER MONITORING APPARATUS AND PERFORM AGAIN MIGRATION PROCESSING WITH DESIGNATED CLIENT ID.
  - RESTRICTION BY NUMBER OF SUPPORTED DEVICES
  - COMMUNICATION WITH DEVICE IS NOT POSSIBLE

FOLLOWINGS ARE DEVICES THAT CANNOT BE MONITORED BY PRESENT MONITORING APPARATUS.
ABC002231, ABC002232, ABC002240, ABC002245, ABC002247,
ABC002250, ABC002252, ABC002255, ABC002258, ABC002259,
ABC002261, ABC002262, ABC002263, ABC002265

MIGRATION PROCESSING HAS BEEN COMPLETED.
MIGRATION DESTINATION CLIENT ID: AAABB0001234

[ OK ]

MONITORING APPARATUS, MONITORING METHOD AND NON-TRANSITORY COMPUTER-READABLE MEDIUM

BACKGROUND OF THE INVENTION

Field of the Invention

The present invention relates to a monitoring apparatus, a monitoring method, and a non-transitory computer-readable medium, and in particular to a technique for migrating monitoring between different types of monitoring apparatuses.

Description of the Related Art

Conventionally, there are device management systems that remotely monitor the operation state of a device, e.g., an image forming apparatus such as a printer or a multifunction peripheral. In the device management systems, a monitoring apparatus placed on, for example, the customer side and a central management apparatus are connected to each other via the Internet. Device data collected by the monitoring apparatus is transmitted to the central management apparatus, and the central management apparatus manages the device data in a centralized manner. The central management apparatus manages, as monitoring information, customer information, monitoring apparatus information, monitoring target information and the like in a unified manner.

There are various configurations/types of the monitoring apparatus, and the type of the monitoring apparatus is selected according to a network environment on the customer side on which a monitoring target is placed. Examples of the type of the monitoring apparatus includes a type in which the monitoring apparatus is incorporated into a device and the device directly transmits only monitoring data on the device to the central management apparatus, and a type in which monitoring data on a plurality of devices on a network is collected by a PC or another device and transmitted altogether to the central management apparatus. Furthermore, due to a difference in the connection configuration or casing properties, monitoring functions and the number of devices capable of being monitored vary between the types of the monitoring apparatuses.

Here, a change in the network environment of the customer or a change in demand for the monitoring function may require migration from an existing monitoring apparatus placed on the customer side to another different monitoring apparatus. For example, Japanese Patent Laid-Open No. 2011-135552 proposes to perform safe communication between a device and a monitoring apparatus in migration from a type in which a device itself functions as a monitoring apparatus to a type in which another monitoring apparatus such as a PC is used.

Furthermore, on the central management apparatus side, an operation for changing settings with respect to the monitoring apparatus is currently performed manually. When simple migration of the monitoring apparatus is not possible due to the network environment or the number of devices that can be monitored by a monitoring apparatus that is to newly be placed, a serviceman needs to separate/integrate into a group of devices that are monitored by an existing monitoring apparatus, and register the devices again.

However, Japanese Patent Laid-Open No. 2011-135552 neither mentions how to change settings on the central management apparatus side when changing the monitoring apparatus, nor proposes a solution for complicated and cumbersome setting change on the central management apparatus side. For example, when integrating a plurality of groups of devices to be monitored, it is necessary to consider whether or not a monitoring apparatus that is newly to be placed can monitor all devices of monitoring targets, taking into consideration not only the maximum number of the devices that can be monitored by a new monitoring apparatuses but also the network circumferences in which the devices of monitoring targets are placed. In other words, even if the condition of the maximum number of the devices that can be monitored is satisfied but the monitoring apparatus cannot communicate with all the devices, it is not possible to integrate the devices into one. Therefore, the serviceman needs to confirm the network environment of the customer and then identify devices that can be integrated.

Furthermore, the sales company/serviceman is in charge of separating the group of devices of monitoring targets and assigning them to a plurality of monitoring apparatuses, and needs to perform a troublesome operation including a confirmation operation. Although the operation is troublesome as described above, automated or semi-automated processing of migration between different types of monitoring apparatuses has not been proposed until now.

SUMMARY OF THE INVENTION

According to one aspect of the present invention, there is provided a monitoring apparatus that is placed on a site network including a plurality of apparatuses, and communicates with a management server, comprising: an input unit configured to accept an input of identification information on one or more other monitoring apparatuses that were previously placed on the site network and were monitoring the plurality of apparatuses; a request unit configured to transmit a request including the input identification information to the management server; a receiving unit configured to receive, as a response to the request, type information on the one or more other monitoring apparatuses from the management server; a processing unit configured to determine, if the received type information does not match type information of the monitoring apparatus, one or more apparatuses that serve as monitoring targets of the monitoring apparatus from among the plurality of apparatuses that were being monitored by the one or more other monitoring apparatuses; a notification unit configured to notify the management server of information on the one or more other monitoring apparatuses whose monitoring target was changed and of the type information of the monitoring apparatus; and a transmission unit configured to collect, after the notification unit made notification, operation information on the one or more apparatuses that were determined by the processing unit as monitoring targets of the monitoring apparatus, and to transmit the collected operation information to the management server.

According to another aspect of the present invention, there is provided a monitoring method of a monitoring apparatus that is placed on a site network including a plurality of apparatuses, and communicates with a management server, the method comprising: accepting an input of identification information on one or more other monitoring apparatuses that were previously placed on the site network and were monitoring the plurality of apparatuses; transmitting a request including the input identification information to the management server; receiving, as a response to the request, type information on the one or more other monitoring apparatuses from the management server; determining, if the received type information does not match type information of the monitoring apparatus, one or more apparatuses that serve as monitoring targets of the monitoring apparatus from among the plurality of apparatuses that were being monitored by the one or more other monitoring apparatuses; notifying the management server of information on the one or more other monitoring apparatuses whose monitoring target was changed and of the type information of the monitoring apparatus; and collecting, after notification was made in the notifying step, operation information on the one or more apparatuses that were determined in the determining step as monitoring targets of the monitoring apparatus, and transmitting the collected operation information to the management server.

According to another aspect of the present invention, there is provided a non-transitory computer-readable medium storing a program for causing a computer that is placed in a site network including a plurality of apparatuses to function as: an input unit configured to accept an input of identification information on one or more other monitoring apparatuses that were previously placed on the site network and were monitoring the plurality of apparatuses; a request unit configured to transmit a request including the input identification information to the management server; a receiving unit configured to receive, as a response to the request, type information on the one or more other monitoring apparatuses from the management server; a processing unit configured to determine, if the received type information does not match type information of the monitoring apparatus, one or more apparatuses that serve as monitoring targets of the computer from among the plurality of apparatuses that were being monitored by the one or more other monitoring apparatuses; a notification unit configured to notify the management server of information on the one or more other monitoring apparatuses whose monitoring target was changed and of the type information of the computer; and a transmission unit configured to collect, after the notification unit made notification, operation information on the one or more apparatuses that the processing unit that were determined as monitoring targets of the computer, and to transmit the collected operation information to the management server.

In a device management system, setting processing on the central management apparatus side that is conventionally cumbersome and performed manually can be performed with a reduced number of operations, achieving a significant improvement in operability.

Further features of the present invention will become apparent from the following description of exemplary embodiments (with reference to the attached drawings).

BRIEF DESCRIPTION OF THE DRAWINGS

FIGS. 8A and 8B are flowcharts illustrating migration processing of the monitoring apparatus according to the present embodiment.

FIGS. 10A and 10B are flowcharts illustrating processing for separating monitoring targets according to the present embodiment.

FIG. 13 is a flowchart illustrating processing for obtaining a deletion target client ID according to the present embodiment.

FIG. 14 is a diagram illustrating an example of a display message according to the present embodiment.

FIG. 15 is a diagram illustrating an example of a default setting screen according to the present embodiment.

FIGS. 16A and 16B are diagrams illustrating examples of a confirmation screen for confirming client migration according to the present embodiment.

FIG. 17 is a diagram illustrating an example of a screen for notifying completion of client migration processing according to the present embodiment.

DESCRIPTION OF THE EMBODIMENTS

First Embodiment

Hereinafter, embodiments for implementing the present invention will be described with reference to the drawings.

System Configuration

Figure 1:
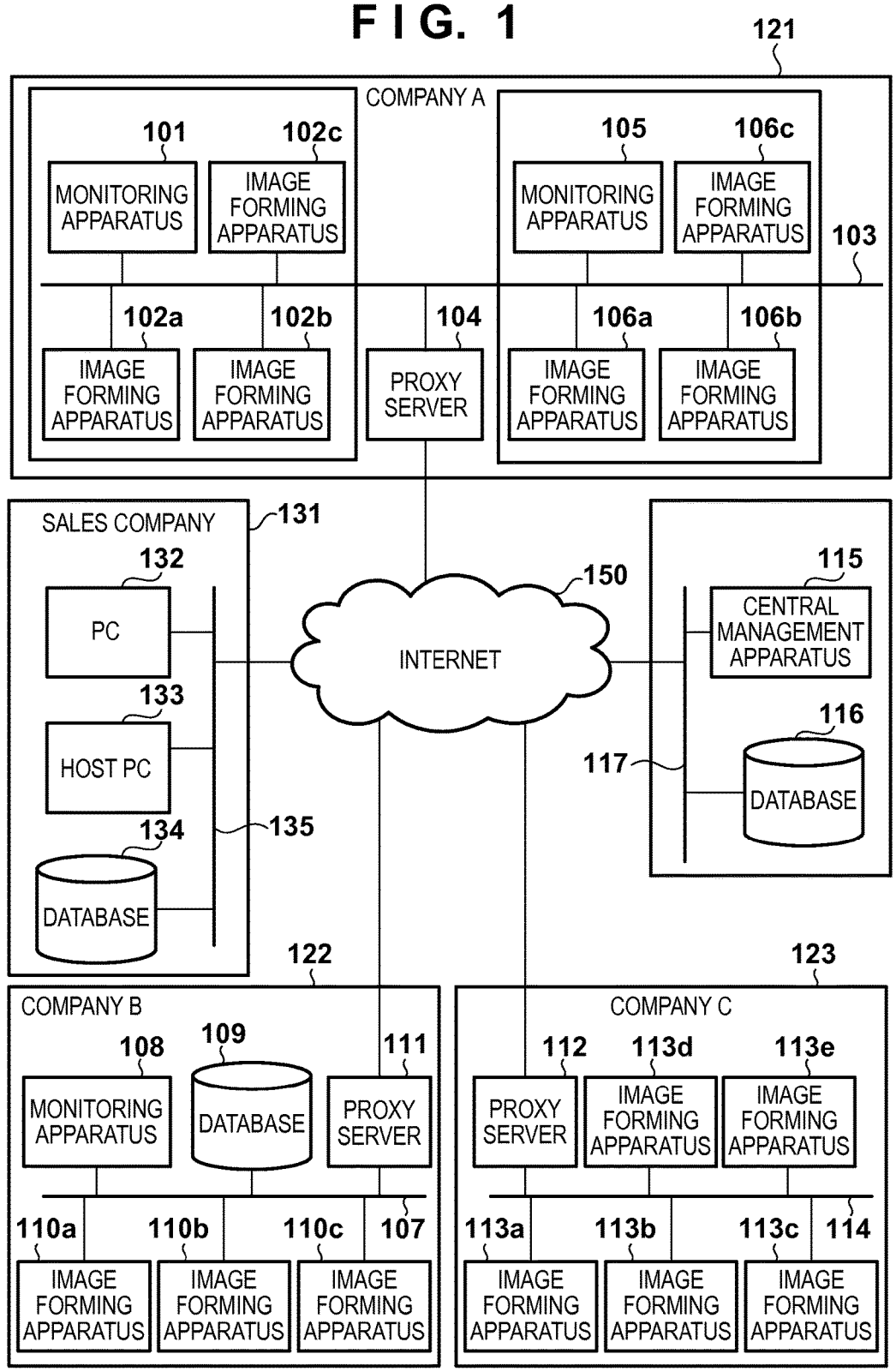
FIG. 1 is a diagram illustrating an example of an overall configuration of a device management system according to the present embodiment.

FIG. 1 is a block diagram illustrating a schematic overall configuration of a device management system according to the present embodiment.

In the device management system, a sales company system 131, a plurality of customer systems such as customer systems 121, 122, and 123, and a central management apparatus 115 are connected to each other via the Internet 150. FIG. 1 shows only one sales company system 131 as an example, but a plurality of sales company systems may actually be connected. The sales company system 131 includes a database 134 in which sales information of a covered area or a customer and information relating to the management system are accumulated.

Furthermore, the sales company system 131 also includes a PC 132 that performs control such as data registration or correction to the database 134. In a sales company, a user uses the PC 132 to access a website provided by the central management apparatus 115, and browses data or changes management information, for example.

Note that a host PC 133 has an operating unit and a display unit that are not shown, and can also function as the PC 132. The PC 132, the host PC 133, and the database 134 are connected to each other via a LAN 135.

FIG. 1 shows that the sales company system 131 is constituted by the plurality of devices, but the sales company system 131 needs only to achieve functions that will be described later. For example, the database 134 may also physically be included in the host PC 133. Furthermore, the database 134 may also be provided at another position via the Internet 150 as long as it is accessible from the host PC 133. That is, the sales company system 131 may include a plurality of devices or a single device.

Furthermore, the central management apparatus 115 is provided at an intermediate position of communication between the systems on the sales company side and the system on the customer side. In other words, the central management apparatus 115 functions as a management server that manages information on the sales company system 131 and the customer system in a centralized manner, and relays the information to a sites or apparatuses as required. A database 116 is a database serving as a history storage unit in which monitoring information, counters of the image forming apparatus collected from the customer system side, failure history information, a failure pattern table, and the like are accumulated.

The central management apparatus 115 and the database 116 are connected to each other via a LAN 117, and the LAN 117 can furthermore be connected to the Internet 150. Note that the database 116 may also physically be included in the central management apparatus 115. Alternatively, the database 116 may also be provided at another position via the Internet 150 as long as it is accessible from the central management apparatus 115. The central management apparatus 115 has the functions to collect, accumulate, and process information on an image forming apparatus serving as a monitoring target, and information (including failure information) indicating the operation state from monitoring apparatuses 101, 105, and 108 that will be described later, and to provide a warning or the like to the outside. Furthermore, the central management apparatus 115 has the function to distribute the information to, for example, the host PC 133 of the sales company system 131. Furthermore, image forming apparatuses 113a to 113e have the function to monitor themselves, and the central management apparatus 115 similarly collects various types of information from the image forming apparatuses.

Examples of operation information relating to the operation state include alarm information such as out of toner, door opening, drum exchange, lack of a cartridge, malfunction of a cooling fan, substrate defect, platen glass contamination, lack of a staple, insufficient in the amount of light of a paper feeding sensor. Besides, examples of the failure information include font memory over flow, rendering error, malfunctions of the fixing device, a counter, and a double-faced unit, and paper jam. Furthermore, examples of the counter information include information on a charge counter indicating a value charged by the sales company, a department counter indicating a value tallied for each department of the customer, a size counter indicating a value tallied for each paper size, a component counter indicating a wear degree of components in an image forming apparatus. The operation information may further include log information including an operation log.

Furthermore, the host PC 133 of the sales company system 131 can register, in the central management apparatus 115, information and settings of monitoring of image forming apparatuses that are defined by the central management apparatus 115 as monitoring targets. The central management apparatus 115 can merge the image forming apparatuses serving as monitoring targets that were registered by a host PC of each sales company system and monitoring settings, and manage them in a unified manner. Furthermore, the central management apparatus 115 can configure monitoring settings with respect to the monitoring apparatus 101, 105, and 108, and the image forming apparatuses 113a to 113e that each have the function to monitor itself.

A service of the device management system is provided based on a contract between the sales company and the customer. Accordingly, only image forming apparatuses that the sales company has decided as monitoring targets based on the contract are regarded as monitoring targets of the present device management system.

The central management apparatus 115 provides a WEB page on which information accumulated in the database 116 or processed information is browsed to the PC 132 connected via the Internet 150. The WEB page provides contents to be browsed in a restricted manner using user authentication, depending on the sales company, the customer, and the user authority. Furthermore, it is also possible to change part of data on the WEB page.

FIG. 1 shows one central management apparatus 115 and one database 116. Actually, however, a plurality of central management apparatuses and databases may perform distributed processing in order to collect information from many image forming apparatuses and monitoring apparatuses, and distribute loads of firmware distribution, for example.

The following will describe a system configuration of a customer side environment. The customer side environment includes a plurality of different environments. In FIG. 1, the customer systems 121, 122, and 123 are shown as site networks that each are constituted by a plurality of apparatuses. The customer systems 121, 122, and 123 are examples that respectively include different types of monitoring apparatuses as constituent components. That is, in each customer system, an apparatus (or a function) that monitors image forming apparatuses constituting the customer system is communicably connected to the image forming apparatuses via a network.

In the customer system 121 (Company A), a plurality of remote monitoring dedicated apparatuses (the monitoring apparatuses 101 and 105) for monitoring a relatively small number (e.g., in a scale of several tens) of devices are placed, and thereby device monitoring is performed. In the customer system 122 (Company B), although only three apparatuses are shown, several hundred to several thousand devices in a large scale environment are actually monitored by a monitoring program installed in a general-purpose PC (monitoring apparatus 108) that is an information processing apparatus. In the customer system 123 (Company C), the image forming apparatuses 113a to 113e are monitored by monitoring functions that are provided in the image forming apparatuses 113a to 113e.

In the customer system 121 (Company A), the image forming apparatuses 102a to 102c that are connected to the LAN 103 connected to the Internet 150 are monitored by the monitoring apparatus 101. The monitoring apparatus 101 communicates with the central management apparatus 115 through a proxy server 104 via the Internet 150. Similarly, image forming apparatuses 106a to 106c are monitored by the monitoring apparatus 105. The monitoring apparatus 105 communicates with the central management apparatus 115 through the proxy server 104 via the Internet 150.

Note that, in the present embodiment, an HTTP/SOAP protocol can be used for communication among the monitoring apparatuses 101 and 105, the central management apparatus 115, and the image forming apparatuses 102, 106, and 113. "Simple Object Access Protocol (SOAP)" is a protocol that is based on "eXtensible Markup Language (XML)" and with which data and services of one computer are called for from another computer. In the present embodiment, SOAP is implemented on "Hyper Text Transfer Protocol (HTTP)". Communication using SOAP is performed by exchanging SOAP messages in which supplementary information is added to an XML document. Therefore, a computer that supports SOAP includes a SOAP message generation unit (not shown) for generating a SOAP message, and a SOAP message interpretation unit (not shown) for interpreting a SOAP message. The state information of the image forming apparatus is transmitted to the central management apparatus 115 with a SOAP message, according to the present embodiment.

The monitoring apparatus 101 stores information collected from the image forming apparatuses 102a to 102c and the processing result of the collected data in a built-in storage device. Furthermore, the monitoring apparatus 101 also stores monitoring settings with respect to the image forming apparatuses 102a to 102c in the build-in storage device. Each time state information (for example, occurrence of a malfunction) has been received from any of the image forming apparatuses 102a to 102c, the monitoring apparatus 101 stores the state information in the build-in storage device, and transmits the received information to the central management apparatus 115. The monitoring apparatus 105 also performs the same processing on the image forming apparatuses 106a to 106c.

Next, a difference of the customer system 122 (Company B) from the customer system 121 will be described. As described above, the monitoring apparatus 108 of the customer system 122 is a general-purpose PC, and the monitoring function is realized by a monitoring program installed in the general-purpose PC. The monitoring program stores the information collected from image forming apparatuses 110a to 110c and the processing result of the collected data in a database 109. Furthermore, the monitoring program also stores settings relating to monitoring of the image forming apparatuses in the database 109. The database 109 is connected to the LAN 107, but may be provided independently within the monitoring apparatus 108. Alternatively, the database 109 may also be provided at another position via the Internet 150, as long as it is accessible from the monitoring apparatus 108.

Next, the difference of the customer system 123 (Company C) from the customer systems 121 and 122 will be described. As described above, the monitoring functions of the customer system 123 are realized by monitoring modules that are placed within the respective image forming apparatuses 113a to 113e. The serviceman or the like of the sales company can enable the monitoring functions, together with required network settings, using setting screens of the image forming apparatuses. Of course, the image forming apparatuses 113a to 113e, similar to the cases of the customer systems 121 and 122, can also obtain monitoring data externally. The remote monitoring functions of the respective image forming apparatuses 113a to 113e are enabled, and the image forming apparatuses 113a to 113e transmit monitoring data to the central management apparatus 115 through a proxy server 112. Furthermore, with each monitoring function, the monitoring information obtained in the corresponding apparatus is temporarily stored in the storage device of the apparatus, and generates transmission data at the time of transmission.

As described above, the device management system includes different types of monitoring apparatuses (clients), and there is a case where, due to the change in the network environment of the customer, migration is necessary between the types of the monitoring apparatuses. Examples of the change in the network environment include the change in the number of monitoring targets arranged in the customer system, and the change in the communication situation.

Furthermore, in the present embodiment, an image forming apparatus is exemplified as a device serving as a monitoring target, and the examples of the image forming apparatus include a printer, a copier, and a Multi-Function Peripheral (MFP), but the present embodiment is not limited to this.

Hardware Configuration

Figure 2:
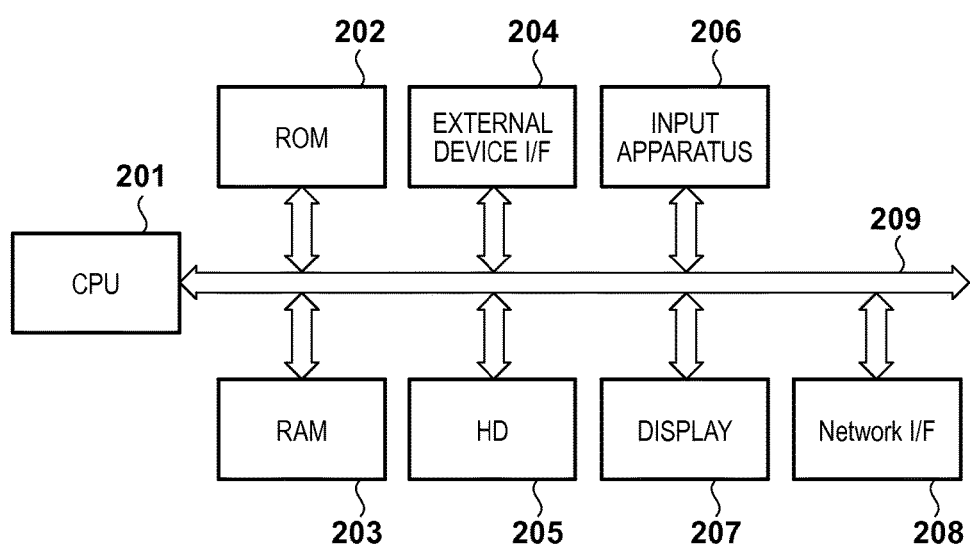
FIG. 2 is a diagram illustrating an example of a hardware configuration of an information processing apparatus according to the present embodiment.

FIG. 2 is a block diagram illustrating an example of a configuration of information processing apparatuses, namely, the monitoring apparatuses 101, 105, and 108, a central management apparatus 115, the host PC 133, and the PC 132 according to the present embodiment. An information processing apparatus that is placed on a back end (not shown) may have the same configuration. In FIG. 2, a CPU 201 is a control unit of the information processing apparatus, and executes an application program, a printer driver program, and an Operating System (OS) that are stored in a storage unit, a device management program according to the present invention, and the like. Note that the present configuration example shows only one CPU 201 but may include a plurality of CPUs 201.

A ROM 202 is a non-rewritable storage unit, and stores therein a basic I/O program, a program executing processing on the present apparatus, fixed data, and the like. A RAM 203 temporarily stores information, files, and the like that are necessary for execution of programs, and functions as a main memory, a work area, or the like of the CPU 201. Note that processing in steps of the monitoring apparatuses 101, 105, and 108 in the flowcharts that will be described later are realized by the CPU 201 executing processing based on program codes stored in the storage unit such as components 204, and 205.

An external device I/F 204 is connected to an external storage device or the like. By connecting the external storage device or the like, it is possible to load a program or the like stored in a storage medium into the information processing apparatus. Note that the storage medium may be any of FD, CD-ROM, CD-R, CD-RW, a PC card, DVD, an IC memory card, MO, a memory stick, or the like. A hard disk (HD) 205 stores various types of data, such as programs and data relating to processes of the information processing apparatus, temporal data, information on an image forming apparatus serving as a monitoring target according to the present invention, and data collected from the image forming apparatus. Furthermore, the present configuration example includes one HD 205 but may include a plurality of HDs 205.

An input apparatus 206 is an instruction input unit such as, for example, a keyboard or a pointing device. A user of the present system such as a serviceman, an operator, or an administrator uses the input apparatus 206 to give an input instruction relating to settings or operations to the information processing apparatus. A display 207 serving as a display unit displays an instruction input through the input apparatus 206, and the state and the settings of the image forming apparatus to be managed. Actually, a graphic card interprets a draw command that was issued by an application via a mechanism of the OS, and information converted into an analog signal or a digital signal is displayed on the display 207, for example. Display control according to the present embodiment encompasses processing for generating a draw command via the OS and displaying the draw command on the display 207.

A network I/F 208 is an interface that is connected to a LAN and the Internet via a network, and through which information is exchanged with the outside. A system bus 209 lets data of the constituent components of the information processing apparatus flow therethrough, and the information processing apparatus exchanges data with an external apparatus via the system bus 209.

Figure 3:
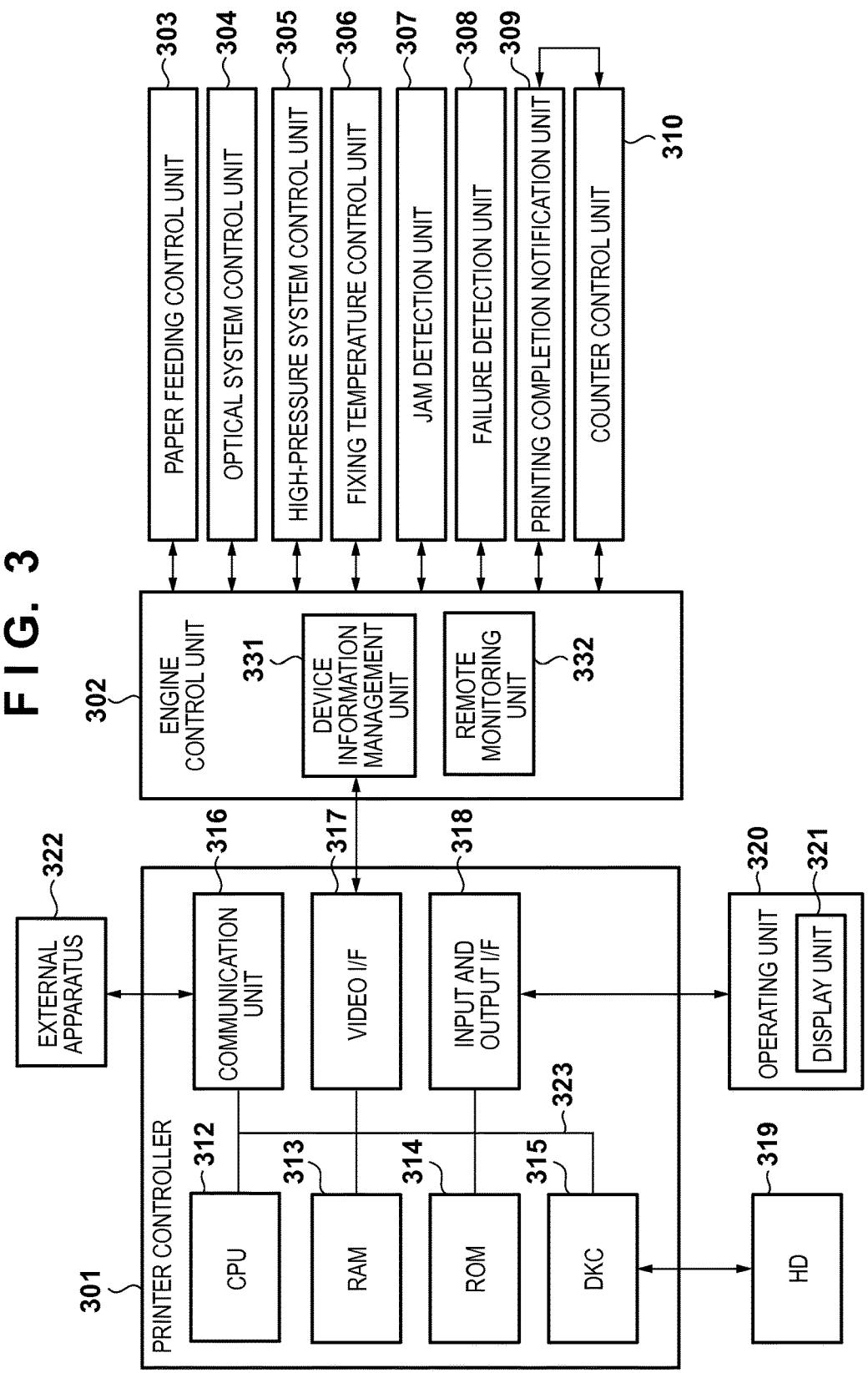
FIG. 3 is a diagram illustrating an example of a hardware configuration of an image forming apparatus according to the present embodiment.

FIG. 3 shows an example of a block configuration of a printer controller of the image forming apparatus according to the present embodiment, and its periphery. A printer controller 301 includes an external apparatus 322 (the monitoring apparatus 101, 105, 108, the central management apparatus 115 or the like of FIG. 1) such as a host computer, and a communication unit 316 for executing transmission and reception of various types of data with a predetermined protocol. The printer controller 301 further includes a video I/F 317 that performs communication and reception of image data, expands the received image data into information that can be printed by the image forming apparatus, and performs signal exchange and serial communication with an engine control unit 302 that will be described later, and the like.

A CPU 312 of the image forming apparatus performs overall control of access to various types of devices that are connected to the system bus 323 based on a control program or the like stored in the ROM 314 or the HD (external memory) 319. Furthermore, the CPU 312 outputs an image signal serving as output information that is output to the engine control unit 302 that is connected via the video I/F 317. A RAM 313 functions as a main memory, a work area, or the like of the CPU 312. A memory controller (DKC) 315 controls access to an external storage medium 319 such as a hard disk (HD) in which a boot program, various types of applications, font data, user files, setting files, and the like are stored. An operating unit 320 includes a display unit 321 and an input unit (not shown) such as a keyboard, and provides information to an operator via an input and output I/F 318 and lets the operator give an input instruction.

An engine control unit 302 exchanges signals with the printer controller 301, and controls units of the printer engine connected via serial communication. A paper feeding control unit 303 feeds and transports paper sheets on which printing is to be performed, and executes paper transport to paper ejection after printing in accordance with an instruction of the engine control unit 302. An optical control unit 304 executes control of driving of a scanner motor (not shown) and turning on/off of a laser in accordance with an instruction of the engine control unit 302.

A high-pressure system control unit 305 executes a high-pressure output that is required for electrophotographic processes, such as charging, development, and transfer, in accordance with an instruction of the engine control unit 302. A fixing temperature control unit 306 controls temperatures of a fixing device, detects a malfunction of the fixing device, and the like, in accordance with an instruction of the engine control unit 302. A jam detection unit 307 detects a transportation failure during paper feeding. A failure detection unit 308 detects a failure of the functional units of the image forming apparatus. A printing completion notification unit 309 detects that printing is normally completed, and notifies the engine control unit 302. A counter control unit 310 updates, after printing, various types of counter information.

The engine control unit 302 includes a device information management unit 331 and a remote monitoring unit 332. The device information management unit 331 manages information on the units of the printer engine, and obtains, for example, a counter value from the counter control unit 310 and passes the obtained counter value to the video I/F 317, in accordance with a request from the external apparatus 322. Accordingly, the counter information is transmitted to the external apparatus 322 via the video I/F 317 and the communication unit 316. Furthermore, upon reception of an information obtaining request from the external apparatus 322, the device information management unit 331 appropriately obtains the information from the units.

The device information management unit 331 further manages jam information notified of by the jam detection unit 307 and error information notified of by the failure detection unit 308. These types of information are also transmitted to the external apparatus 322 via the video I/F 317 and the like when the external apparatus 322 has made an event notification request in advance.

The remote monitoring unit 332 operates when a remote monitoring function has been enabled. The remote monitoring unit 332 appropriately collects monitoring data such as counter information and error information from the device information management unit 331, and transmits the monitoring data to the central management apparatus 115. Furthermore, the image forming apparatus according to the present embodiment is applicable to a laser beam printer using the above-described electrophotographic method, an ink-jet printer using an ink-jet method, a thermal head printer employing a thermal transfer method, a copy machine, and the like.

Software Configuration

Figure 4:
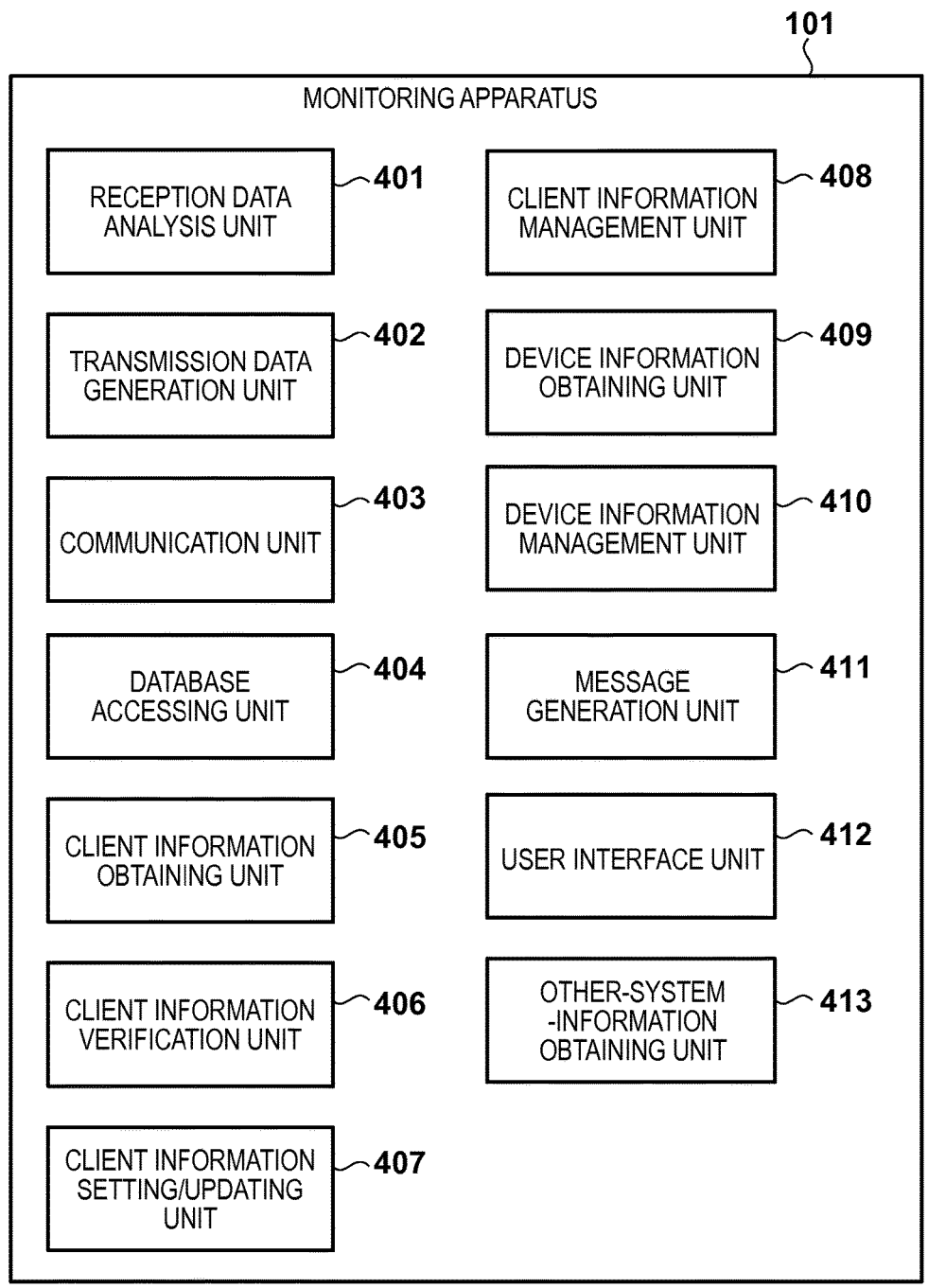
FIG. 4 is a diagram illustrating an example of a software configuration of a monitoring apparatus.

FIG. 4 is a block diagram illustrating an example of a software configuration of the monitoring apparatuses 101, 105, and 108.

A reception data analysis unit 401 analyzes reception data that was received from the central management apparatus 115, and the image forming apparatuses 102, 106, or 110 via a communication unit 403, and transfers the reception data to an appropriate processing unit for each piece of data. A transmission data generation unit 402 generates transmission data that complies with a communication protocol in response to a request from each processing unit. The generated transmission data is transmitted to the central management apparatus 115, and the image forming apparatuses 102, 106, or 110 via the communication unit 403. The communication unit 403 performs data transmission and reception to and from an external information processing apparatus such as the central management apparatus 115, and the image forming apparatuses 102, 106, or 110 via a network such as a LAN and the Internet.

A database accessing unit 404 performs input from and output to the database 109. Furthermore, when required data such as monitoring data and setting data is stored in a build-in storage device or the like, the database accessing unit 404 performs input from and output to this storage device. A client information obtaining unit 405 obtains client information relating to the corresponding monitoring apparatus from the central management apparatus 115 in the present embodiment. A client information verification unit 406 verifies data relating to the client information. A client information setting/updating unit 407 performs setting or updating of client information with respect to the central management apparatus 115 in the present embodiment.

Here, the client information encompasses, as described above, information on a monitoring apparatus type (client type). Examples of the monitoring apparatus type include a type in which a monitoring apparatus is incorporated into a device and the device directly transmits only monitoring data on the device to the central management apparatus, and a type in which monitoring data on a plurality of devices on a network is collected by a PC or another device, and transmitted altogether to the central management apparatus. Note that the client type is not necessarily defined depending on its configuration and may be defined depending on its function.

A client information management unit 408 manages client information. The client information management unit 408 controls the client information obtaining unit 405 to obtain information, controls the client information verification unit 406 to verify the information, and controls the client information setting/updating unit 407 to change the information. A device information obtaining unit 409 obtains device information, such as the state of the image forming apparatus and counter information. A device information management unit 410 manages device information obtained from the device information obtaining unit 409 with respect to image forming apparatuses serving as monitoring targets that are registered in the central management apparatus 115. Various types of information are stored in the database 109 via the database accessing unit 404.

A message generation unit 411 generates a display message relating to migration processing of the present embodiment. A user interface unit 412 displays the generated message on a screen that a customer can browse. The user interface unit 412 displays, as described above, a setting screen, a confirmation screen, a completion screen, and the like according to the present embodiment. Another-system-information obtaining unit 413 obtains information on systems that are different from the present system. The device management system is a system dealing with information such as maintenance, charge, and the like of devices, but there are other systems that provide the same devices of the same customer with other functions such as, for example, job management, document management, and reporting. It is also possible to obtain management information from these systems and use the management information as determination condition of the migration processing of the present embodiment.

Figure 5:
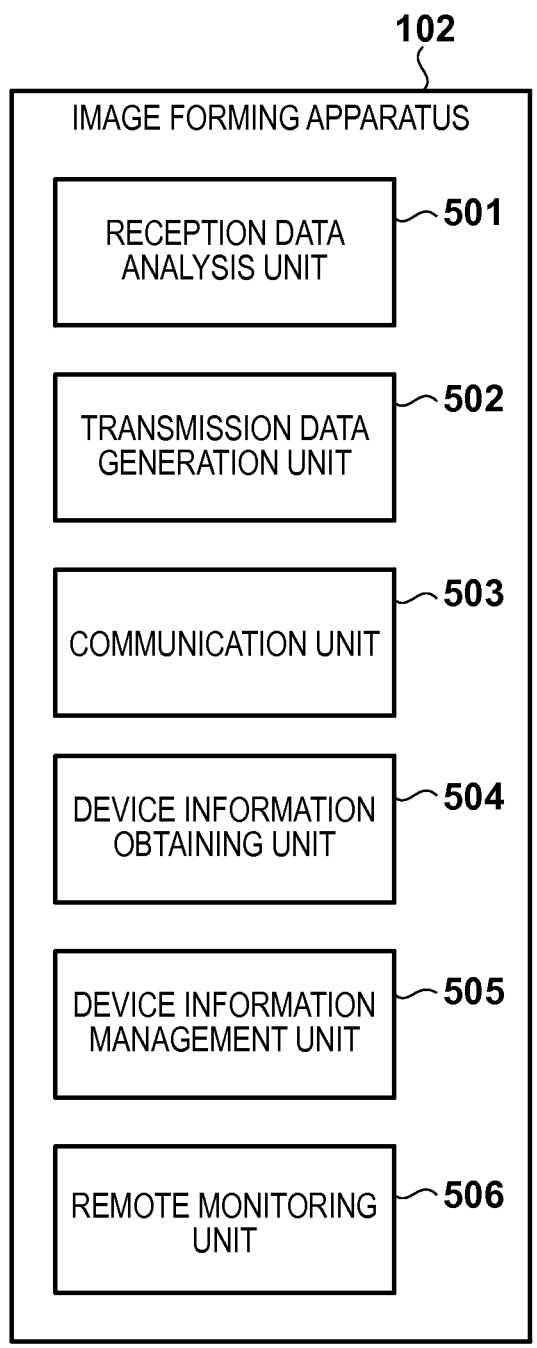
FIG. 5 is a diagram illustrating an example of a software configuration of the image forming apparatus.

FIG. 5 is a block diagram illustrating an example of a software configuration of the image forming apparatuses 102, 106, and 110.

A reception data analysis unit 501 analyzes reception data that was received from the central management apparatus 115, and the monitoring apparatus 101, 105, or 108 via a communication unit 503, and transfers the reception data to an appropriate processing unit for each piece of data. A transmission data generation unit 502 generates transmission data that complies with a communication protocol in response to a request from each processing unit. The generated transmission data is transmitted to the central management apparatus 115, and the image forming apparatuses 102, 106, or 110 via the communication unit 503. The communication unit 503 performs data transmission and reception to and from an external apparatus such as the central management apparatus 115, and the monitoring apparatus 101, 105, or 108 via a network such as a LAN and the Internet.

A device information obtaining unit 504 obtains operation information on a service call, a jam, out of toner, or the like that occurred in the image forming apparatus. The device information obtaining unit 504 further obtains counter information or the like that was stored in the image forming apparatus in accordance with an instruction from the monitoring apparatus 101, 105, or 108. The obtained data is processed into transmission data by the transmission data generation unit 502, and transmitted, by the communication unit 503, to the component such as the monitoring apparatus 101, 105, or 108 that has instructed to obtain the information. A device information management unit 505 manages and controls the device information collected by the device information obtaining unit 504 in accordance with an instruction of a remote monitoring unit 506 when a monitoring function has been enabled. The remote monitoring unit 506 monitors various types of states inside the device when the monitoring function has been enabled. The remote monitoring unit 506 collects, using the device information obtaining unit 504, monitoring information before transmission according to a transmission schedule instructed by the central management apparatus 115. The monitoring information is managed by the device information management unit 505, is processed into transmission data according to the transmission schedule, and is transmitted to the central management apparatus 115 by the communication unit 503. Note that the image forming apparatus including the remote monitoring unit 506 may be configured to be monitored by an external monitoring apparatus, when the monitoring function of the image forming apparatus by the remote monitoring unit 506 is deactivated.

Figure 6:
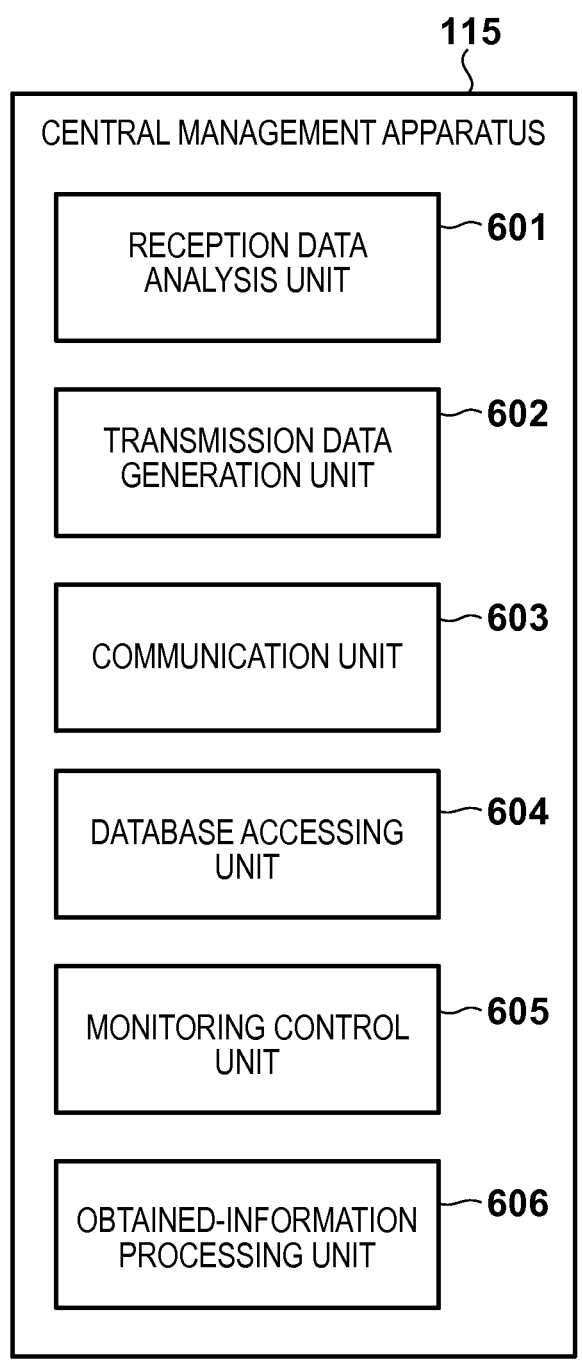
FIG. 6 is a diagram illustrating an example of a software configuration of a central management apparatus.

FIG. 6 is a block diagram illustrating an example of a software configuration of the central management apparatus 115.

A reception data analysis unit 601 analyzes reception data that was received from the monitoring apparatuses 101, 105, and 108, and the image forming apparatuses 102, 106, and 110 via a communication unit 603, and transmits the reception data to an appropriate processing unit for each piece of data. A transmission data generation unit 602 generates transmission data that complies with a communication protocol in accordance with a request from each processing unit. The generated transmission data is transmitted to the monitoring apparatuses 101, 105, and 108, and the image forming apparatuses 102, 106, and 110 via the communication unit 603. The communication unit 603 performs data transmission and reception to and from an external information processing apparatus such as the monitoring apparatus 101, 105, and 108, and the image forming apparatuses 102, 106, and 110 via a network such as a LAN and the Internet.

A database accessing unit 604 performs input from and output to the database 116. A monitoring control unit 605 controls management of a schedule in which monitoring information, charge information, and the like are obtained from all the monitoring apparatuses, monitoring contents and a monitoring method. Furthermore, the monitoring control unit 605 transmits instructions and responses to the monitoring apparatus 101, 105, or 108 that is managed by the central management apparatus 115, or the monitoring functions of the image forming apparatuses 113 managed by the central management apparatus 115 via the transmission data generation unit 602 and the communication unit 603, as required. An obtained-information processing unit 606 stores the information, with or without being processed, that is obtained from the monitoring apparatus 101, 105, or 108 managed by the central management apparatus 115, or the monitoring functions of the image forming apparatuses 113 managed by the central management apparatus 115 in the database 116 via the database accessing unit 604. Furthermore, the obtained-information processing unit 606 notifies the serviceman who is in charge or the customer of tally of counter information, error information, and the like, based on the information received from the monitoring apparatus 101, 105, or 108, or the monitoring functions of the image forming apparatuses 113, and the stored data in the database 116.

Process Flow

Figure 7:
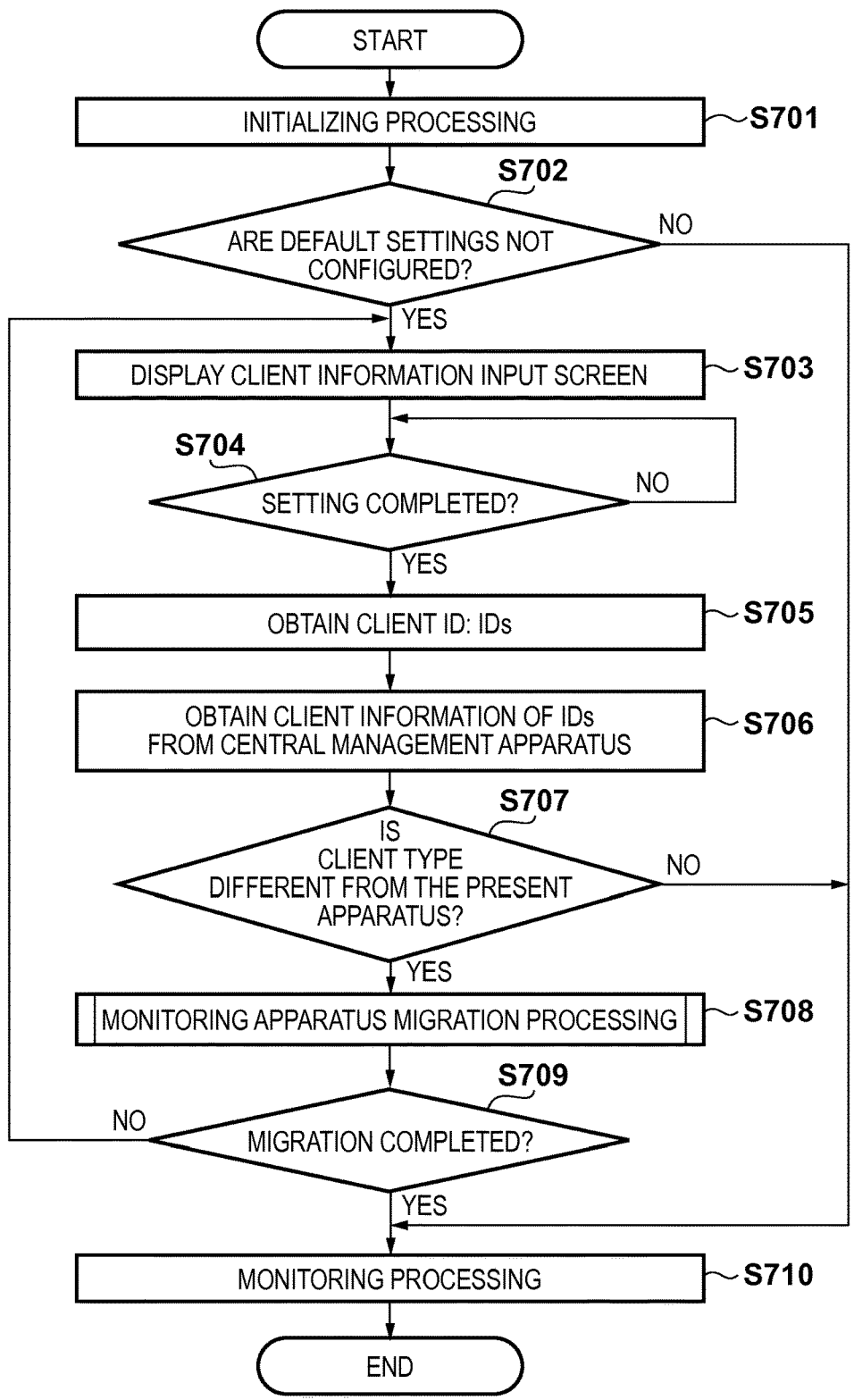
FIG. 7 is a flowchart illustrating an operation of the monitoring apparatus according to the present embodiment.

FIG. 7 is a main flowchart showing operations of the monitoring apparatuses 101, 105, and 108, or the monitoring functions of the image forming apparatuses 113 according to the present embodiment. For ease of description, the description will be given only with respect to the monitoring apparatus 105 in the Company B, although it is also applicable to the monitoring apparatuses 101 and 108, or the monitoring functions of the image forming apparatuses 113. Note that processes in steps of the flowcharts of FIGS. 7 to 13 are realized by the CPU 201 provided in the monitoring apparatus 105 reading a control program according to the present embodiment that is stored in a nonvolatile storage unit such as the ROM 202 or the HD 205 and executing the read control program. Furthermore, in the present flowcharts, only processes relating to the present invention will be described and other description will be omitted. Furthermore, in the description below, an image forming apparatus that is to be monitored is referred to as a monitoring target or simply as a device.

First, the CPU 201 initializes a system in response to power-on (S701). Specifically, the CPU 201 reads, as default setting information, an information table of information on all image forming apparatuses to be monitored, the information table serving as a device list, and performs processing for initializing variables for example. When monitoring image forming apparatuses serving as targets are set in the device list, the device list is stored in the storage unit and the device information obtaining unit 409 can obtain the device list. Furthermore, the device list includes device IDs for uniquely identifying the devices serving as monitoring targets. For example, a serial number, an MAC address, or the like of each device is assigned to the device ID.

Then, the CPU 201 determines whether or not the default setting information read in step S701 is invalid data (that is, whether or not default settings are not set) (S702). If it is determined that default settings were not set (YES in step S702), the CPU 201 displays a default setting screen on which client information can be input (S703). Here, an example of the displayed default setting screen is shown in FIG. 15. A default setting screen 1501 of FIG. 15 includes input areas 1502, 1503, and 1504 in which a user name, a password, and a client ID can respectively be input as account information with which a user can access client information of the central management apparatus 115. Note that it is also possible that a plurality of client IDs are input into the input area 1504.

The client ID is identification information for uniquely identifying a monitoring apparatus (client), and the usage of the client ID will be described in detail later. Furthermore, when a monitoring apparatus is migrated, a client ID that is to be input into the default setting screen 1501 of FIG. 15 is a client ID of a monitoring apparatus that previously performed monitoring. Furthermore, migration processing of a monitoring apparatus is not necessary when the client ID of that monitoring apparatus is input, and monitoring processing will further be performed by that monitoring apparatus. Hereinafter, a monitoring apparatus that previously (before migration) performed monitoring is referred to as "previous client", and a monitoring apparatus that newly performs monitoring after migration is referred to as "migration destination client".

The CPU 201 determines whether or not setting in the default setting screen 1501 has been completed (S704). If it is determined that setting has not been completed (NO in step S704), the CPU 201 stands by until setting is completed. If it is determined that setting has been completed (YES in step S704), the CPU 201 obtains an input client ID as IDs (S705). Then, the CPU 201 transmits a request including the obtained IDs to the central management apparatus 115, and obtains, as a response thereof, client information corresponding to the IDs from the central management apparatus 115 (S706). The CPU 201 determines whether or not client type information included in the client information obtained in step S706 is different from the client type of the present monitoring apparatus (S707). Note that client type information of the present monitoring apparatus was defined in advance and is stored in the storage unit or the like.

If the client type is different (YES in step S707), this indicates that migration processing of the client is necessary, and the CPU 201 will perform monitoring apparatus migration processing, which will be described later with reference to FIGS. 8A and 8B (S708). If the client type match each other (NO in step S707), this indicates that the migration processing is unnecessary, and the CPU 201 starts monitoring processing (S710). After the monitoring apparatus migration processing in step S708, the CPU 201 determines whether or not the migration processing has normally been completed (S709).

If it is determined that the migration processing has normally been completed (YES in step S709), the CPU 201 starts, in step S710, the monitoring processing (S710). If the migration processing has not normally been completed due to cancellation of migration or the like (NO in step S709), the CPU 201 returns again to display of the default setting screen since the CPU 201 cannot start the monitoring processing (S703). Since a conventional method is applicable to the monitoring processing in step S710, a detailed description of the monitoring processing will be omitted. However, the monitoring processing will be performed based on monitoring settings obtained from the central management apparatus 115 and a schedule of various types of processing of monitoring, for example. Furthermore, the CPU 201 collects various types of information in the monitoring processing, and then transmits the collected information to the central management apparatus 115 via a network.

Monitoring Apparatus Migration Processing

Figure 8A:
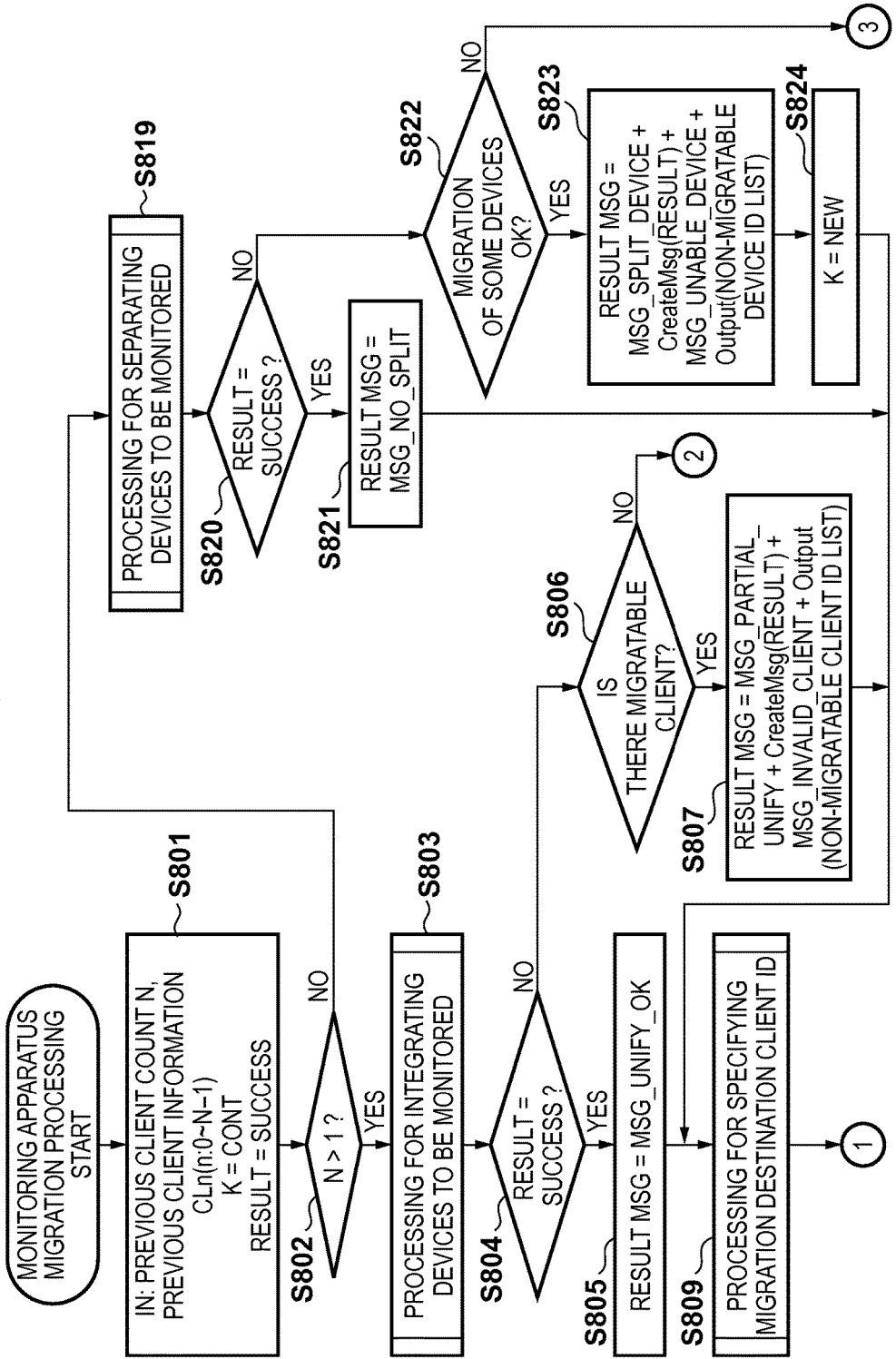

The following will describe the monitoring apparatus migration processing in step S708 of FIG. 7 with reference to FIGS. 8A and 8B. First, this processing is executed mainly by the client information management unit 408, unless otherwise noted. The IN argument and the process variable for use in this processing are shown in step S801. The client information management unit 408 obtains, as an IN argument, a previous client count N and previous client information CLn (where n is 0 to N−1) by the process flow shown in FIG. 7. The information obtained here is actually information obtained from the central management apparatus 115 based on the client ID that a user has input on the default setting screen 1501. Furthermore, the client information management unit 408 initializes a migration destination client type K serving as a process variable to "CONT (continue)" (K=CONT). K is a value indicating whether a migration destination client is newly created or the current client is continuously used, wherein the former is defined as "NEW (new)" and the latter is defined as "CONT (continuous)". Furthermore, the client information management unit 408 initializes a processing result "RESULT" of this processing, which is an output of this processing, to a default "SUCCESS (success)" (RESULT=SUCCESS). "RESULT" includes values indicating processing results of the migration processing as follows:
SUCCESS: The migration processing has normally been completed;
CANCELLED: The processing is cancelled by a user;
DELETE_OK: The migration processing has normally completed. A client ID is deleted during the migration processing;
DELETE_NG: The migration processing has normally been completed. An unnecessary client ID was caused during the migration processing but not deleted; and
Various types of error values: an OR-operation value of an error flag "ERROR_FLAG" and bit assigned definition values indicating various types of errors. Furthermore, according to the present embodiment, the various types of error values include:
EXCESS_DEVICE: Exceedance of the maximum device count to be supported (maximum device count to be monitored);
COM_ERR: Communication with devices is impossible; and
OTHER_APPLIANCE_MANAGED: Management by other monitoring apparatuses of other system.

Then, the client information management unit 408 determines whether or not the previous client count N is greater than 1 (S802). If N>1 (YES in step S802), the client information management unit 408 executes integration processing for integrating a group of devices serving as monitoring targets (S803). This processing will be described in detail later with reference to FIGS. 9A and 9B. If N≤1 (NO in step S802), the client information management unit 408 executes separation processing for separating the group of devices serving as monitoring targets (S819). This processing will be described in detail later with reference to FIGS. 10A and 10B.

Figure 16A:
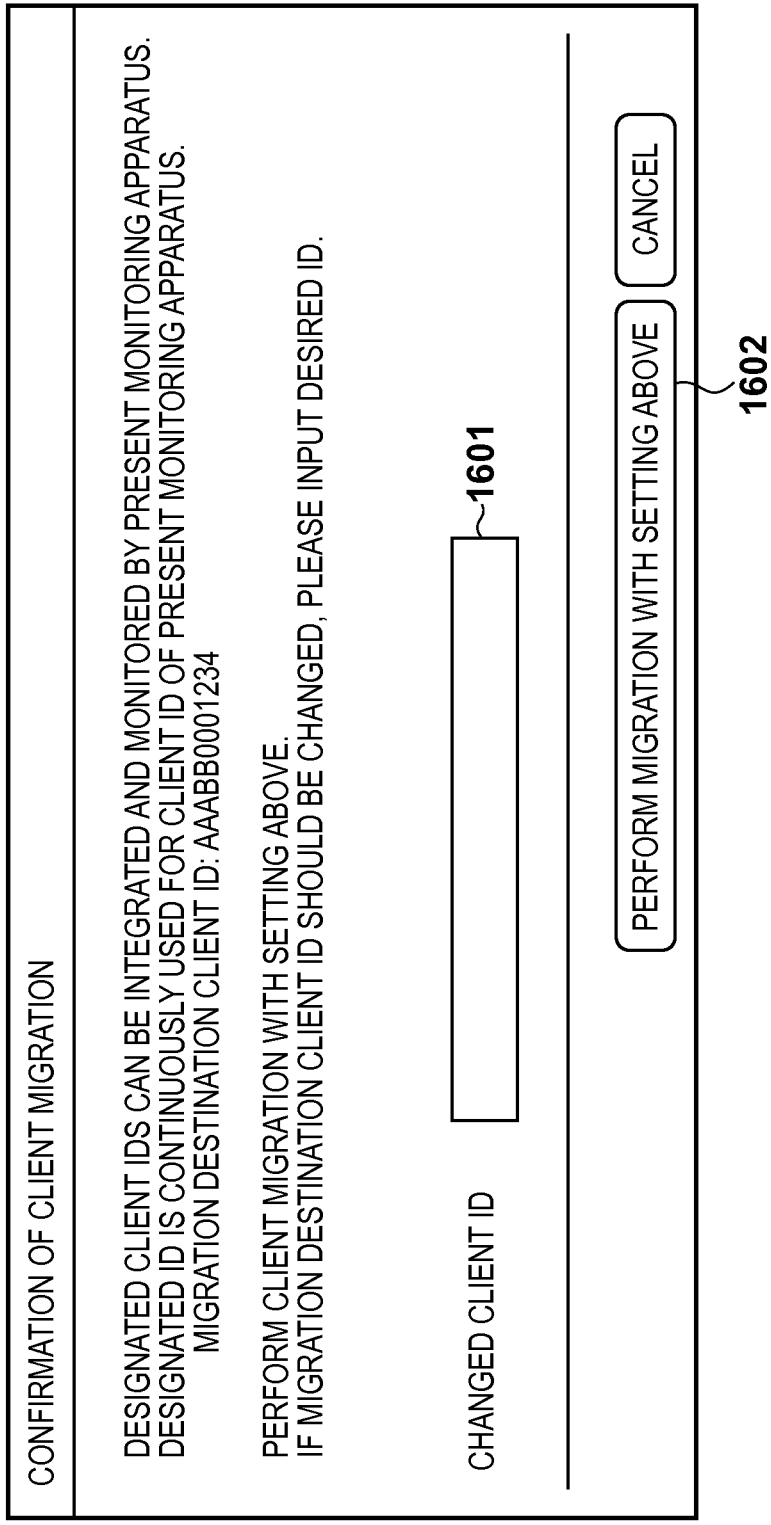

The client information management unit 408 determines whether or not the processing result "RESULT" obtained as an output of the integration processing in step S803 is "SUCCESS (success in the processing)" (S804). If RESULT=SUCCESS (YES in step S804), the client information management unit 408 initializes, using the message generation unit 411, the result message to "MSG_UNIFY_OK" (Result MSG=MSG_UNIFY_OK) (S805). Then, the procedure advances to step S809. The result message here is denoted by "Result MSG" in FIGS. 8A and 8B, and is displayed on the processing result screen or the confirmation screen to the user. Here, "MSG_UNIFY_OK" is defined in a message table as shown in FIG. 14, and is stored in a setting file on a program, or in the database or memory. In the present embodiment, a character string that is displayed on the processing result screen or the confirmation screen is generated based on these definition messages, character strings indicating various types of information, and the like. FIG. 16A shows configuration examples of the confirmation screen.

In the case of RESULT≠SUCCESS (NO in step S804), the client information management unit 408 determines whether or not the size of a migratable client ID list obtained as an output of the integration processing (S803) is equal to or greater than 1 (S806). Note here that the case where the size of the list is equal to or greater than 1 is a case where a migratable client is included. If a migratable client is included (YES in step S806), the client information management unit 408 generates, as "Result MSG", the following message indicating that a migratable client is partially included (S807).

Result MSG=MSG_PARTIAL_UNIFY+CreateMsg (RESULT)+MSG_INVALID_CLIENT+Output(a non-migratable client ID list)

Here, as shown in FIG. 14, "CreateMsg (RESULT)" has different messages depending on the value of "RESULT".

If a migratable client is not included (NO in step S806), the client information management unit 408 sets Result MSG to a character string obtained by combining MSG_UNIFY_NG and the character string obtained by CreateMsg (RESULT), indicating a failure of migration (S808). Then, the client information management unit 408 displays the Result MSG on the processing result screen (S826).

On the other hand, if it is determined that a plurality of previous client IDs are not designated (NO in step S802), the client information management unit 408 performs processing for separating the monitoring targets (S819). Then, the client information management unit 408 determines whether or not the processing result "RESULT", which is obtained as an output of the separation processing (S819), is "SUCCESS (success in the processing)" (S820).

If RESULT=SUCCESS (YES in step S820), the client information management unit 408 initializes the Result MSG to "MSG_NO_SPLIT" (Result MSG=MSG_NO_SPLIT) (S821). Then, the procedure advances to step S809. If RESULT≠SUCCESS (NO in step S820), the client information management unit 408 determines whether or not the size of the migratable client ID list obtained as an output in step S819 is equal to or greater than 1 (that is, whether or not some of the devices can be migrated) (S822). If some of the devices can be migrated (YES in step S822), the client information management unit 408 generates, as "Result MSG", the following message indicating that some of the monitoring apparatuses can be migrated (S823).

Result MSG=MSG_SPLIT_DEVICE+CreateMsg (RESULT)+MSG_UNABLE_DEVICE+Output(a non-migratable device ID list)

Then, after step S823, the client information management unit 408 sets K to "NEW" (K=NEW) (S824). When a single previous client ID is designated but some of devices cannot be migrated, this indicates that it is necessary to generate a new migration destination client, and thus this setting processing will be performed. Then, the procedure advances to step S809.

On the other hand, if a migratable client is not included (NO in step S822), the client information management unit 408 sets Result MSG to a character string that is obtained by combining MSG_SPLIT_NG and a character strings obtained by CreateMsg (RESULT), indicating a failure of migration (S825). Then, the client information management unit 408 displays the Result MSG on the processing result screen (S826).

After step S805, S807, S821, or S824, the client information management unit 408 performs processing for specifying a migration destination client ID (S809). This processing will be described in detail later with reference to FIG. 11. After the specifying processing (S809), the client information management unit 408 determines whether or not the migration destination client type K obtained as an output of the specifying processing is "NEW" (S810). If K=NEW (YES in step S810), the client information management unit 408 generates a new migration destination client. Here, the client information management unit 408 newly sets Result MSG to a character string obtained by combining the currently set Result MSG, MS_ID_CREATE, and Output (migration destination client ID) (S811). At that time, the migration destination client ID can be obtained as an output of the specifying processing (S809).

If K≠NEW (NO in step S810), the client information management unit 408 uses the existing migration destination client. Here, the client information management unit 408 newly sets Result MSG to a character string obtained by combining the currently set Result MSG, MSG_ID_CONTINUE, and Output (migration destination client ID) (S812). After steps S811 and S812, the client information management unit 408 performs processing for updating settings of the central management apparatus 115 (S813). This processing will be described in detail later with reference to FIGS. 12A and 12B.

After the setting updating processing (S813), the client information management unit 408 determines whether or not "RESULT" obtained as an output of the setting updating processing is "CANCELLED" (that is, whether or not the migration processing has been cancelled) (S814). If RESULT=CANCELLED (YES in step S814), the client information management unit 408 outputs "RESULT" and ends this processing (S827).

If RESULT≠CANCELLED (NO in step S814), the client information management unit 408 determines whether or not "RESULT" is "DELETE_OK" (that is, whether or not the migration processing has normally ended and whether or not there is the deleted client) (S815). If RESULT=DELETE_OK (YES in step S815), the client information management unit 408 newly sets Result MSG to a character string obtained by combining the currently set Result MSG, MSG_CLIENT_DELETED, the character string obtained by Output (DCL), and MDS_CLIENT_SETTING_COMPLETE (S816). Here, "DCL" refers to a deletion target client ID list obtained as an output of the setting updating processing (S813).

If RESULT≠DELETE_OK (NO in step S815), the client information management unit 408 determines whether or not the size of DCL is equal to or greater than 1 (that is, whether or not there is unnecessary client) (S817). If the size of DCL is equal to or greater than 1 (YES in step S817), the client information management unit 408 newly sets Result MSG to a character string obtained by combining the currently set Result MSG, MSG_NOTIFY_USELESS_CLIENT, the character string obtained by Output (DCL), and MDS_CLIENT_SETTING_COMPLETE (S818).

If the size of DCL is 0 (NO in step S817), this indicates that there is not a deletion target client/unnecessary client, and the client information management unit 408 displays a processing result screen with the currently set Result MSG (S826). After step S816 or S818, the client information management unit 408 displays the Result MSGs obtained in respective steps on the processing result screen (S826). After the processing of step S826, the client information management unit 408 outputs "RESULT" and ends this processing (S827).

FIG. 17 shows an example of the processing result screen. In the example shown in this screen, the message indicates the case where some of the image forming apparatuses serving as a monitoring target cannot be monitored when a single designated client ID is included, due to two reasons of (1) exceedance of the number of devices to be supported and (2) an error of communication with the devices. Furthermore, the example of FIG. 17 shows the case where the migration processing itself has normally been completed.

Integration Processing

Figure 9A:
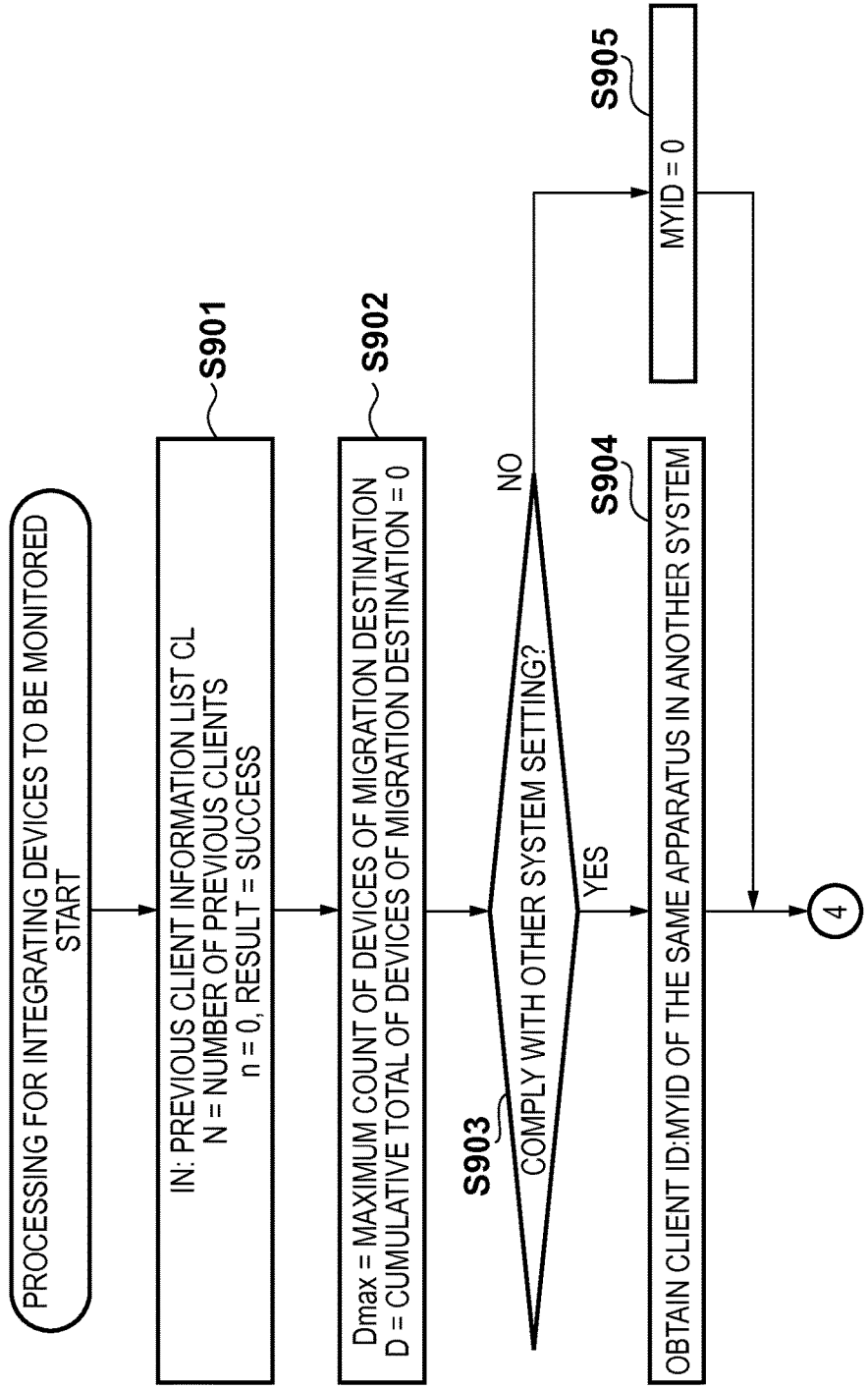
FIGS. 9A and 9B are flowcharts illustrating processing for integrating monitoring targets according to the present embodiment.
Figure 9B:
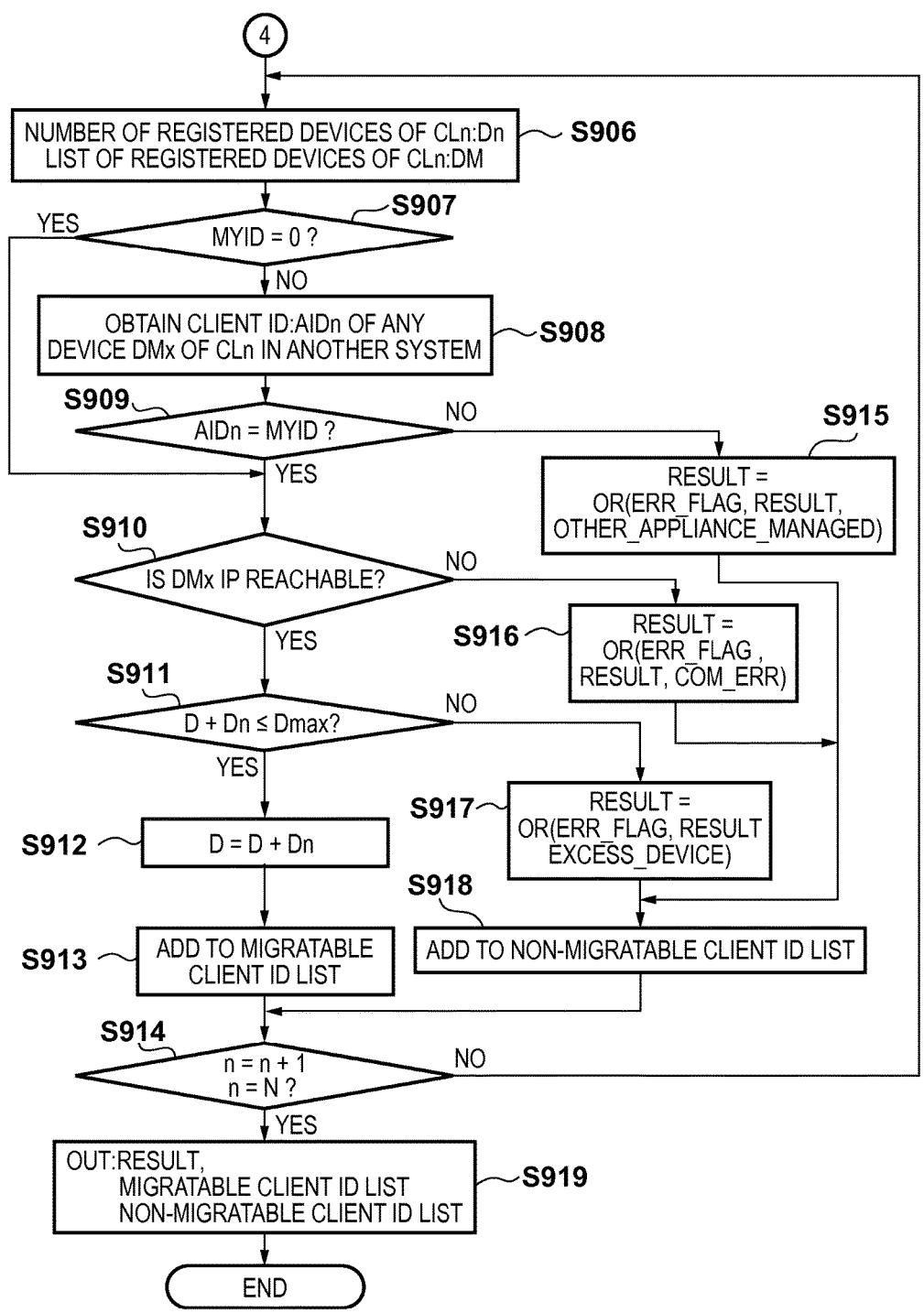

Hereinafter, processing for integrating monitoring targets in step S803 of FIG. 8A will be described with reference to FIGS. 9A and 9B. First, this processing is a part of the monitoring apparatus migration processing, and is executed mainly by the client information management unit 408, unless otherwise noted. The IN argument and the process variable for use in this processing are shown in step S901. The client information management unit 408 obtains the previous client count N and the previous client information CLn (where n is 0 to N−1) as an IN argument, by the monitoring apparatus migration processing. Furthermore, the client information management unit 408 initializes the process variable n to "0", and initializes "RESULT" to "SUCCESS" (n=0, and RESULT=SUCCESS).

Then, the client information management unit 408 obtains the maximum count Dmax of devices that the migration destination client (that is, the present apparatus) can support (can monitor), and initializes the process variable D that holds the cumulative total of devices of the migration destination to "0" (D=0) (S902).

Then, the client information management unit 408 determines whether or not to comply with settings of another system (S903). In the present embodiment, it is assumed that the monitoring apparatus (client) of the migration destination serves also as a monitoring apparatus/management apparatus of the other system, and management information on this system can be obtained. In such a monitoring apparatus, it is preferable to configure such that image forming apparatuses of the customer be monitored by the same monitoring apparatus. For example, common data, once obtained, can be used and thus efficiency of management is high. Furthermore, common data can be obtained in the same schedules, and control of the data is thus easy and management data has also uniformity.

If it is determined to comply with settings of another system (YES in step S903), the client information management unit 408 obtains, as a variable MYID, a client ID of the present apparatus (monitoring apparatus) in the other system (S904). If it is determined not to comply with settings of another system (NO in step S903), the client information management unit 408 initializes MYID to "0" (MYID=0) (S905).

Then, the client information management unit 408 performs processing for each previous client. First, the client information management unit 408 obtains a registered device count Dn and a registered device list DM of the n-th previous client CLn (S906). The client information management unit 408 determines whether or not the MYID obtained in step S904 or S905 is "0" (S907). If MYID≠0 (NO in step S907), the client information management unit 408 obtains, as a variable AIDn, the client ID of the monitoring apparatus that is monitoring the device DMx registered in the previous client CLn in the other system (S908). Where x is an arbitrary number but may be, for example, "0" that indicates the head device. This client ID may be obtained from a server of another system, or a data management unit of the monitoring apparatus of another system.

Then, the client information management unit 408 determines whether or not AIDn and MYID are identical (S909). In the example described here, it is assumed that the previous clients are monitored by the same monitoring apparatus even if they are of different systems. However, in the system in which they are not monitored by the same monitoring apparatus, it is necessary to perform the processing of steps S908 and S909 for each device.

If AIDn=MYID (YES in step S909) and if MYID=0 (YES in step S907), the client information management unit 408 determines whether or not the present monitoring apparatus can communicate with the device DMx (S910). This determination may be based on actually obtaining, using the device information obtaining unit 409 and the communication unit 403, some kind of information, for example, information such as a serial number or an MAC address, from the image forming apparatus. Furthermore, in this case, if the image forming apparatus was turned off, the information cannot be obtained, and thus the determination may be based on whether or not an IP address exists on the same sub-net. Furthermore, when an image forming apparatus is registered under the host name, determination may also be made by obtaining an IP address by name resolution.

If the present monitoring apparatus can communicate with the device DMx (YES in step S910), the client information management unit 408 determines whether or not the sum of the cumulative total of devices of the migration destination (present apparatus) and the registered device count Dn of the previous client that is being processed is Dmax or less (S911). That is, the client information management unit 408 determines whether or not the sum of devices to be monitored exceeds the maximum count (upper limit) of devices that the migration destination client (present apparatus) can monitor, and migration of monitoring targets is performed in a range that does not exceed the upper limit. If the sum of the devices is the maximum device count or less (YES in step S911), the client information management unit 408 adds the registered device count Dn of the previous client to the cumulative total D of devices, and newly sets D to the obtained sum total (S912). Then, the client information management unit 408 adds a client ID of the client that is being processed to the migratable client ID list (S913).

If AIDn≠MYID (NO in step S909), the client information management unit 408 sets "RESULT" to an error value, obtained by OR operation, that indicates that the device should be monitored by another apparatus (S915). As described above, the error reason was Bit-assigned, and it is possible to indicate a plurality of error reasons, by performing OR operation. Note that in step S915 of FIG. 9B, the OR operation is described as OR (ERR_FLAG, RESULT, OTHER_APPLIANCE_MANAGED). This indicates that the error flag and OTHER_APPLIANCE_MANAGED are OR-operated and set as the obtained "RESULT".

If the present monitoring apparatus cannot communicate with the device MDx (NO in step S910), the client information management unit 408 will set "RESULT" to an error value, obtained by OR operation, that indicates a communication error (S916). Furthermore, if the sum of the devices is greater than the maximum device count (NO in step S911), the client information management unit 408 sets "RESULT" to an error value, obtained by OR operation, that indicates exceedance of the maximum device count (S917).

After the processing in steps S915, S916, and S917, the client information management unit 408 adds the client ID of the client that is being processed to a non-migratable client ID list (S918). After processing of step S913 or S918, the client information management unit 408 increments n by 1 and determines whether or not the resultant n is equal to N (that is, whether or not all the clients have been processed) (S914). If n=N (YES in step S914), the client information management unit 408 outputs "RESULT", the migratable client ID list obtained in step S913, and the non-migratable client ID list obtained in step S918, and ends this processing (S919). If n≠N (NO in step S914), the procedure returns to step S906.

Separation Processing

Figure 10B:
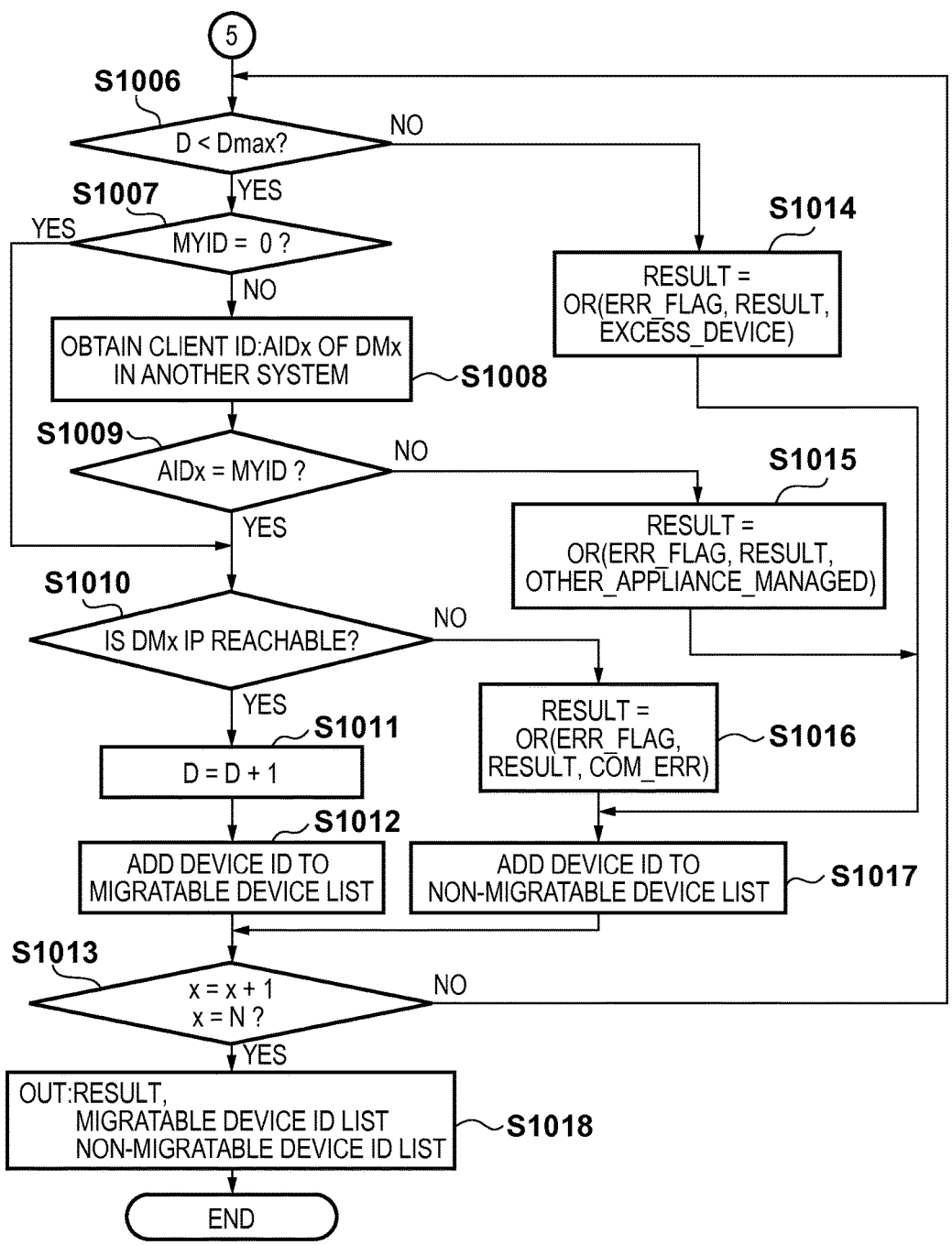

Hereinafter, separation processing for separating monitoring targets in step S819 of FIG. 8A will be described with reference to FIGS. 10A and 10B. First, this processing is a part of the monitoring apparatus migration processing, and is executed mainly by the client information management unit 408, unless otherwise noted. The IN argument and the process variable for use in this processing are shown in step S1001. The client information management unit 408 obtains, as an IN argument, a previous client information list CL, a registered device count N of the clients in the CL, and a registered device list DM of the clients in the CL by the monitoring apparatus migration processing. Furthermore, the client information management unit 408 initializes the process variable x to "0", and initializes "RESULT" to "SUCCESS" (x=0, RESULT=SUCCESS). In this processing, only one client is registered in the previous client information list CL.

Then, the client information management unit 408 obtains the maximum count Dmax of devices that the migration destination client (that is, present apparatus) can support (can monitor), and initializes the process variable D that holds the cumulative total of devices of the migration destination to "0" (D=0) (S1002). Then, the client information management unit 408 determines whether or not to comply with settings of another system (S1003). In the present embodiment, as described above, it is assumed that the monitoring apparatus of the migration destination serves also as a monitoring apparatus/management apparatus of the other system, and management information on this system can be obtained.

If it is determined to comply with settings of another system (YES in step S1003), the client information management unit 408 obtains, as a variable MYID, a client ID of the present apparatus in the other system (S1004). If it is determined not to comply with settings of another system (NO in step S1003), the client information management unit 408 initializes the MYID to "0" (MYID=0) (S1005). After the processing in step S1004 or S1005, the client information management unit 408 determines whether or not D is smaller than Dmax (that is, whether or not the cumulative total of devices of the migration destination does not exceed the maximum count of devices to be monitored) (S1006). If D<Dmax (YES in step S1006), the client information management unit 408 determines whether or not MYID is "0" (that is, whether or not to comply with settings of another system) (S1007). If MYID≠0 (NO in step S1007), the client information management unit 408 obtain the client ID of the monitoring apparatus in the other system that monitors the x-th element DMx in the device list DM (S1008). As described above, this client ID may be obtained from a server of another system, or a data management unit of the present apparatus (monitoring apparatus) of another system.

After processing in step S1008, the client information management unit 408 determines whether or not AIDx and MYID are identical (S1009). If AIDx=MYID (YES in step S1009) and if MYID=0 (YES in step S1007), the client information management unit 408 determines whether or not the present monitoring apparatus can communicate with the device DMx (S1010). In this determination, the same method as that described with reference to step S910 is executed.

If present monitoring apparatus can communicate with the device DMx (YES in step S1010), the client information management unit 408 increments the cumulative total of devices of the migration destination by 1 (S1011), and adds the device ID of the device that is being processed to a migratable device list.

If D≥Dmax (NO in step S1006), the client information management unit 408 sets "RESULT" to an error value, obtained by OR operation, that indicates exceedance of the maximum device count (S1014).

If AIDx≠MYID (NO in step S1009), the client information management unit 408 sets "RESULT" to an error value, obtained by OR operation, that indicates that the device should be monitored by another apparatus (S1015).

If the present monitoring apparatus cannot communicate with the device DMx (NO in step S1010), the client information management unit 408 will set "RESULT" to an error value, obtained by OR operation, that indicates a communication error (S1016).

After the processing in steps S1014, S1015, and S1016, the client information management unit 408 adds the device ID of the device that is being processed to a non-migratable device ID list (S1017). After the processing in step S1012 or S1017, the client information management unit 408 increments x by 1, and determines whether or not the resultant x is equal to N (that is, whether or not all the devices have been processed) (S1013). If x=N (YES in step S1013), the client information management unit 408 outputs "RESULT", the non-migratable device ID list obtained in step S1012, and the non-migratable device ID list obtained in step S1017, and ends this processing (S1018). If x≠N (NO in step S1013), the procedure returns to step S1006.

Specifying Processing

Figure 11:
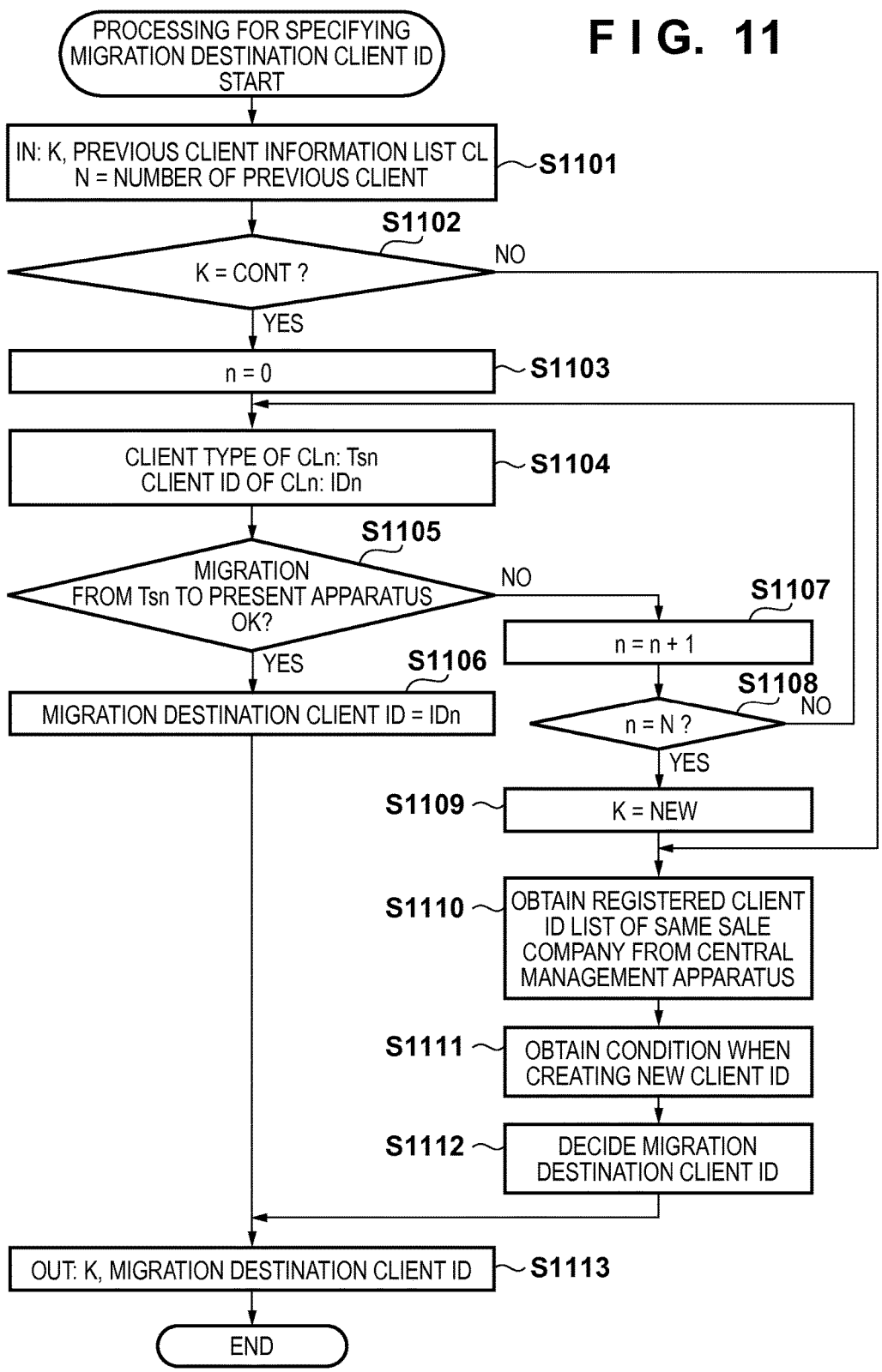
FIG. 11 is a flowchart illustrating processing for specifying a migration destination client ID according to the present embodiment.

Hereinafter, specifying processing for specifying a migration destination client ID in step S809 of FIG. 8A will be described with reference to FIG. 11. First, this processing is a part of the monitoring apparatus migration processing, and is executed mainly by the client information management unit 408, unless otherwise noted. The IN argument and the process variable for use in this processing are shown in step S1101. The client information management unit 408 obtains, as an IN argument, a migration destination client type K and a previous client information list CL by the monitoring apparatus migration processing.

The client information management unit 408 determines whether or not K obtained as an IN argument is CONT (that is, whether or not the client ID is continuously used) (S1102). If K=CONT (YES in step S1102), the client information management unit 408 initializes the process variable n to "0" (n=0) (S1103). Then, in order to process clients registered in the previous client information list CL, the client information management unit 408 obtains the client type Tsn of the n-th client information CLn, and IDn serving as the n-th client ID (S1104).

Then, the client information management unit 408 determines whether or not migration to present apparatus from Tsn is possible (S1105). In the present embodiment, it is assumed that determination conditions were already defined as information in a setting file, a program main body, or the like at the initial time of the program. If the migration is possible (YES in step S1105), the client information management unit 408 defines the migration destination client ID as IDn (S1106). Then, the client information management unit 408 outputs K and the migration destination client ID, and ends the processing (S1113).

If the migration is not possible (NO in step S1105), the client information management unit 408 will increment n by 1 (S1107). Then, the client information management unit 408 determines whether or not n is equal to N (That is, whether or not all the previous clients have been processed) (S1108). If n≠N (NO in step S1108), the procedure returns to step S1104. If n=N (YES in step S1108), the client information management unit 408 sets "K" to "NEW" (K=NEW) (S1109).

After the processing in step S1109, or if K≠CONT (NO in step S1102), the client information management unit 408 performs processing for deciding a client ID that is to be newly created. First, the client information management unit 408 obtains a list of registered client IDs of the same sales company from the central management apparatus 115 (S1110). In the present embodiment, the list of registered client IDs is obtained, but it is also possible to configure that a list of client IDs that have not yet been registered is obtained from the central management apparatus 115. Also, in the present embodiment, client IDs are defined uniquely in each sales company, and thus information is obtained for each sales company.

After the processing in step S1110, the client information management unit 408 obtains a condition for creating a new client ID (S1111). Similarly to the determination condition in step S1105, the determination condition for creating a new client ID is defined at the initial time of the program. Examples of the condition include a condition in which the smallest number is assigned, and a condition in which the number that is closest to the previous client ID is assigned. Then, the client information management unit 408 decides the migration destination client ID based on the list obtained in step S1110 and the condition obtained in step S1111 (S1112). Then, the client information management unit 408 outputs K and the migration destination client ID, and ends this processing (S1113).

Setting Updating Processing

Figure 12A:
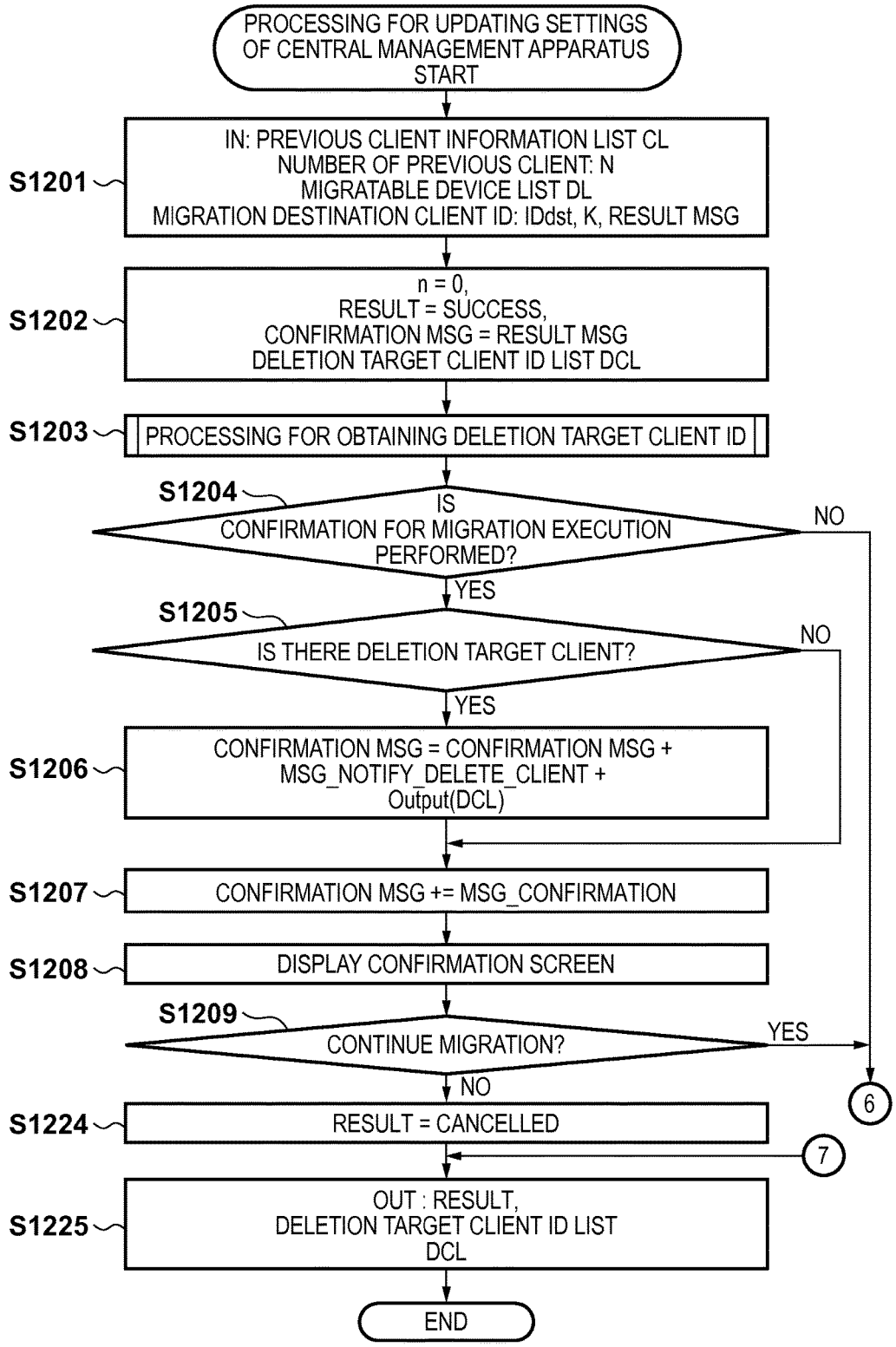
FIGS. 12A and 12B are flowcharts illustrating processing for updating settings of the central management apparatus according to the present embodiment.
Figure 12B:
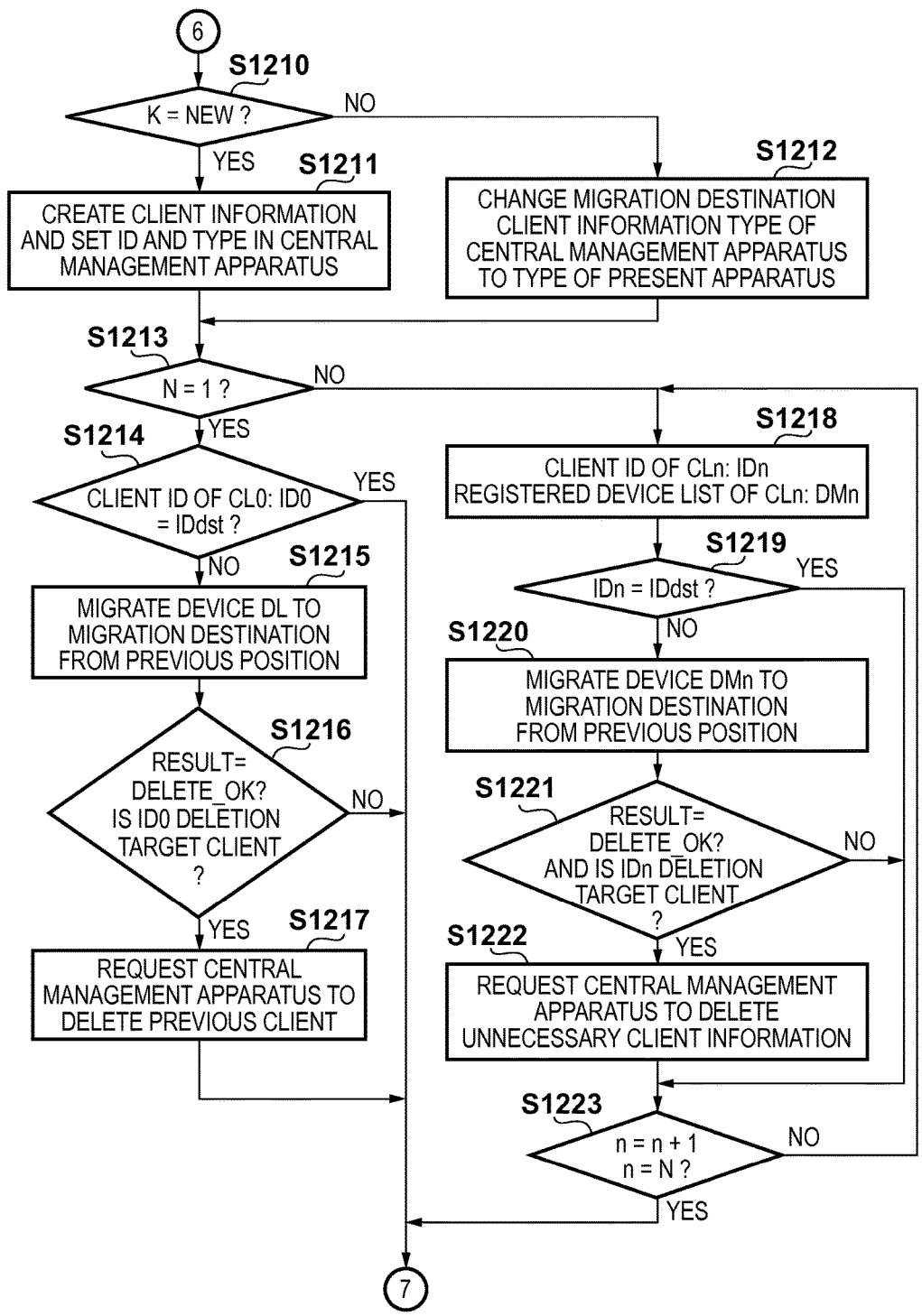

Hereinafter, setting updating processing of the central management apparatus 115 in step S813 of FIG. 8B will be described with reference to FIGS. 12A and 12B. First, this processing is a part of the monitoring apparatus migration processing, and is executed mainly by the client information management unit 408, unless otherwise noted. The IN argument and the process variable for use in this processing are shown in step S1201. The client information management unit 408 obtains, as an IN argument, the previous client information list CL, the previous client count N, the migratable device list DL, and IDdst, which serves as a migration destination client ID, the migration destination client type K, and Result MSG, by the monitoring apparatus migration processing.

The client information management unit 408 initializes the process variable n to "0", initializes "RESULT" to "SUCCESS", and initializes the value of Confirmation MSG to the value of Result MSG. Furthermore, the client information management unit 408 initializes a deletion target client ID list DCL (S1202).

The client information management unit 408 performs processing for obtaining a deletion target client ID (S1203). This processing will be described in detail later with reference to FIG. 13. Then, the client information management unit 408 determines whether or not the user confirms migration execution (S1204). In the present embodiment, the setting values for use in the determination here are stored as program defaults that can be set in the setting file or on the default setting screen, for example.

If it is determined that migration execution is confirmed (YES in step S1204), the client information management unit 408 determines whether or not there is a deletion target client as an output of step S1203 (S1205). If there is a deletion target client (YES in step S1205), the client information management unit 408 combines MSG_NOTIFY_DELETE_CLIENT and a character string obtained in Output (DCL) with Confirmation MSG (S1206).

If there is not a deletion target client (NO in step S1205) or after the processing in step S1206, the client information management unit 408 combines MSG_CONFIRMATION with Confirmation MSG (S1207). Then, the client information management unit 408 displays a confirmation message on the confirmation screen (S1208). FIGS. 16A and 16B show examples of the confirmation screen. FIG. 16A displays the confirmation message indicating that monitoring targets of the designated client IDs are integrated and the migration processing is normally completed, and that the client IDs are continuously used. Furthermore, an input area 1601 is provided in order to enable the migration destination client ID to be changed. Furthermore, a button 1602 for giving an instruction to continue migration is also provided. FIG. 16B shows a confirmation message indicating that some of monitoring targets cannot be monitored but the other devices can normally be migrated, and that a client ID of a migration destination is created. Also in FIG. 16B, similar to FIG. 16A, an input area 1603 is provided in order to enable the client ID of the migration destination to be changed. Furthermore, a button 1604 for giving an instruction to continue migration is provided.

After the processing in step S1208, the client information management unit 408 determines whether or not an instruction to continue the migration was given by a user via the confirmation screen (S1209). If the instruction to continue the migration was given (NO in step S1209), the client information management unit 408 sets "RESULT" to "CANCELLED" (RESULT=CANCELLED) (S1224). Then, the client information management unit 408 outputs "RESULT" and the deletion target client ID list, and ends this processing (S1225).

If the instruction to continue the migration was given (YES in step S1209), or if migration execution is not confirmed (NO in step S1204), the client information management unit 408 determines whether or not "K" is "NEW" (S1210). If K=NEW (YES in step S1210), the client information management unit 408 notifies the central management apparatus 115 of IDdst, which is the migration destination client ID, and the client type of the present apparatus, requests the central management apparatus 115 to newly create client information, and cause the central management apparatus 115 to create the client information (S1211). If K≠NEW (NO in step S1210), the client information management unit 408 notifies the central management apparatus 115 of the type of the registered migration destination client information and causes the central management apparatus 115 to change the type to the type of present apparatus (S1212).

After the processing in step S1211 or S1212, the client information management unit 408 determines whether or not N is "1" (S1213). If N=1 (YES in step S1213), the client information management unit 408 determines whether or not ID0, which is the client ID of the head element CL0 of CL, is equal to IDdst (S1214). If ID0≠IDdst (NO in step S1214), this indicates that monitoring targets should be moved, and the client information management unit 408 moves all the devices registered in the migratable device list DL from the previous client to the migration destination client (S1215). The movement is realized by transmitting a setting change request to the central management apparatus 115.

Then, the client information management unit 408 determines whether or not "RESULT" in step S1203 is "DELETE_OK" (that is, whether or not deletion processing is executed), and whether or not ID0 is included in the deletion target client ID list obtained in step S1203 (S1216). If the condition in step S1216 is satisfied (YES in step S1216), the client information management unit 408 executes deletion by transmitting a request for deleting the previous client to the central management apparatus 115 (S1217).

If N≠1 (NO in step S1213), the client information management unit 408 obtains IDn, which is the client ID of CLn, and a list DMn of the devices registered in the CLn, in order to process all the previous clients (S1218). Then, the client information management unit 408 determines whether or not IDn is equal to IDdst (S1219). If IDn≠IDdst (NO in step S1219), this indicates that the monitoring target should be moved, and the client information management unit 408 moves all the devices in the migratable device list DMn from the previous client to the migration destination client (S1220). Then, the client information management unit 408 determines whether or not "RESULT" in step S1203 is "DELETE_OK" (that is, whether or not deletion processing is executed), and whether or not IDn is included in the deletion target client ID list obtained in step S1203 (S1221). If the condition of step S1221 is satisfied (YES in step S1221), the client information management unit 408 executes deletion by transmitting a request for deleting the previous client to the central management apparatus 115 (S1222).

After the processing in step S1222, or if IDn=IDdst (YES in step S1219), or if the condition in step S1221 is not satisfied (NO in step S1221), the client information management unit 408 increments n, and determines whether or not the resultant n is equal to N (S1223). If n=N (YES in step S1223), or if ID0=IDdst (YES in step S1214), or if the condition in step S1216 is not satisfied (NO in step S1216), or after the processing in step S1227, the client information management unit 408 outputs "RESULT" and the deletion target client ID list, and ends this processing (S1225). If n≠N (NO in step S1223), the procedure returns to step S1218.

Processing for Obtaining Deletion Target Client ID

Hereinafter, processing for obtaining a deletion target client ID in step S1203 will be described with reference to FIG. 13. First, this processing is a part of the setting updating processing of the central management apparatus 115, and is executed mainly by the client information management unit 408, unless otherwise noted. The IN argument and the process variable for use in this processing are shown in step S1301. The client information management unit 408 obtains, as an IN argument, the previous client information list CL, the previous client count N, the migratable device list DL, and IDdst, which serves as a migration destination client ID, by the monitoring apparatus migration processing. The client information management unit 408 initializes the process variable n to "0", and initializes "RESULT" to "DELETE_NG" (n=0, RESULT=DELETE_NG).

In order to process all the previous clients, the client information management unit 408 obtains, IDn, which is the client ID of CLn, and a list DMn of the devices registered in the CLn (S1302). Then, the client information management unit 408 determines whether or not N is equal to 1 (S1303). If N=1 (YES in step S1303), the client information management unit 408 determines whether or not ID0 is equal to IDdst (S1304). If ID0≠IDdst (NO in step S1304), the client information management unit 408 determines whether or not the unnecessary client is to be deleted (S1305). In the present embodiment, the setting values for use in the determination here are stored as program defaults that can be set in the setting file or on the default setting screen, for example.

If the unnecessary client is to be deleted (YES in step S1305), the client information management unit 408 determines whether or not the number of devices registered in DM0 is equal to the number of devices in the migratable device list DL (S1306). If the number of devices are equal to each other (YES in step S1306), the client information management unit 408 sets "RESULT" to "DELETE_OK", and registers ID0 in DCL (S1307).

If N≠1 (NO in step S1303), the client information management unit 408 determines whether or not IDn is equal to IDdst (S1309). If IDn≠IDdst (NO in step S1309), the client information management unit 408 determines whether or not the unnecessary client is to be deleted (S1310). The determination here is the same as in step S1305.

If the unnecessary client is to be deleted (YES in step S1310), the client information management unit 408 sets "RESULT" to "DELETE_OK", and registers IDn in DCL (S1311). If IDn=IDdst (YES in step S1309), or if the unnecessary client is not to be deleted (NO in step S1310), or after the processing in step S1311, the client information management unit 408 increments n by 1, and determines whether or not the resultant n is equal to N (that is, whether or not all the clients have been processed) (S1312). If n≠N (NO in step S1312), the procedure returns to step S1309. After the processing in step S1307, or if ID0=IDdst (YES in step S1304), or if the unnecessary client is not to be deleted (NO in step S1305), or if the numbers of devices are not equal to each other (NO in step S1306), or if n=N (YES in step S1312), the client information management unit 408 outputs "RESULT" ("DELETE_OK" or "DELETE_NG") and the deletion target client ID list DCL, and ends this processing (S1308).

Accordingly, in the device management system, setting processing on the central management apparatus side that is conventionally cumbersome and performed manually can be performed with a reduced number of operations, achieving a significant improvement in operability. Furthermore, it is possible to execute migration processing more reliably than that performed manually.

Second Embodiment

The first embodiment has described a configuration as shown in FIG. 15 in which a user designates a previous client ID. Here, since processing for specifying a previous client ID is assigned to a user, the operation of the user arises.

In contrast, the present embodiment describes a method in which the monitoring apparatus (migration destination client) searches for a previous client ID, instead of the user inputting a previous client ID. On a default setting screen as shown in FIG. 15, a button (not shown) for obtaining a client ID is provided. Upon pressing the obtaining button, device information already registered in the monitoring apparatus is obtained, or a device on the network is searched and information on the device extracted by the search is obtained.

Using, as a key, a device ID for uniquely specifying a device associated with the device information, the client ID of the monitoring apparatus registered in the central management apparatus 115 is obtained. Then, the obtained client ID is displayed in a client ID field on the default setting screen, thereby making it possible to save user's troubles for inputting a previous client ID.

According to the present embodiment, a further improvement in the user's operability, in addition to the effects of the first embodiment, can be achieved.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-214142, filed Oct. 11, 2013, which is hereby incorporated by reference herein in its entirety.

What is claimed is:

1. A monitoring apparatus that is placed on a site network including a plurality of apparatuses, and communicates with a management server, the monitoring apparatus comprising:
a memory storing instructions; and
a processor executing the instructions causing the monitoring apparatus to:
accept an input of identification information on one or more other monitoring apparatuses that were previously placed on the site network and were monitoring the plurality of apparatuses;
transmit a request including the input identification information to the management server;
receive, as a response to the request, type information on the one or more other monitoring apparatuses from the management server;
determine whether or not the received type information matches type information of the monitoring apparatus;
separate, if it is determined that the received type information does not match the type information of the monitoring apparatus, one or more apparatuses, as monitoring targets of the monitoring apparatus, from among the plurality of apparatuses, wherein the plurality of apparatuses were being monitored by the one or more other monitoring apparatuses;
provide a confirmation screen that displays, when the one or more apparatuses, which were monitored by the one or more other monitoring apparatuses, are changed to the monitoring targets of the monitoring apparatus by the separation processing, information of apparatuses that have not been separated as the monitoring targets of the monitoring apparatus by the separation processing;
provide a result screen that is displayed when the monitoring targets of the one or more other monitoring apparatuses were changed to the monitoring targets of the monitoring apparatus;
transmit, to the management server, a notification of information on the one or more other monitoring apparatuses whose monitoring target was changed and of the type information of the monitoring apparatus;

collect, after the notification, operation information on the one or more apparatuses from among the plurality of apparatuses that were separated as monitoring targets of the monitoring apparatus; and transmit the collected operation information to the management server, wherein the result screen displays at least one of a result of the change of the monitoring apparatus that performs monitoring, information on the changed monitoring apparatus, information on a monitoring target apparatus that can no longer be monitored, and a reason why the monitoring target apparatus can no longer be monitored, and wherein the confirmation screen further includes notification information indicating a recommendation of further migration processing using another monitoring apparatus for apparatuses that have not been separated as the monitoring targets by the separation processing.

2. The monitoring apparatus according to claim 1, wherein the separation processing is such that, among the apparatuses that were being monitored by a single other monitoring apparatus, apparatuses with which the monitoring apparatus can communicate are separated in a range that does not exceed an upper limit for a number of apparatuses that the monitoring apparatus can monitor, and are taken as monitoring targets.

3. The monitoring apparatus according to claim 1, wherein the confirmation screen accepts, as identification information on the monitoring apparatus, either designation of new identification information or an instruction to continue to use the identification information on the one or more other monitoring apparatuses; and wherein the instructions further cause the monitoring apparatus to transmit the identification information accepted on the confirmation screen to the management server.

4. The monitoring apparatus according to claim 1, wherein the instructions further cause the monitoring apparatus to:

accept an instruction to display the identification information on the one or more other monitoring apparatuses that were previously placed on the site network and were monitoring the plurality of apparatuses;

search for, when having accepted the instruction, the plurality of apparatuses included in the site network; and display identification information on a monitoring apparatus that was previously monitoring the plurality of apparatuses that were searched for.

5. The monitoring apparatus according to claim 1, wherein the type information of the monitoring apparatus is defined depending on at least any one of a configuration, form, and function of the monitoring apparatus.

6. The monitoring apparatus according to claim 1, wherein the operation information includes at least any one of failure information, counter information, alarm information, and log information.

7. The monitoring apparatus according to claim 1, wherein the identification information on the monitoring target is a serial number or an MAC address.

8. A monitoring method of a monitoring apparatus that is placed on a site network including a plurality of apparatuses, and communicates with a management server, the method comprising:

accepting an input of identification information on one or more other monitoring apparatuses that were previously placed on the site network and were monitoring the plurality of apparatuses;

transmitting a request including the input identification information to the management server;

receiving, as a response to the request, type information on the one or more other monitoring apparatuses from the management server;

determining whether or not the received type information matches type information of the monitoring apparatus;

separating, if it is determined that the received type information does not match the type information of the monitoring apparatus, one or more apparatus, as monitoring targets of the monitoring apparatus, from among the plurality of apparatuses, wherein the plurality of apparatuses were being monitored by the one or more other monitoring apparatuses;

providing a confirmation screen that displays, when the one or more apparatus, which were monitored by the one or more other monitoring apparatuses, are changed to the monitoring targets of the monitoring apparatus by the separation processing, information of apparatuses that have not been separated as the monitoring targets of the monitoring apparatus by the separation processing;

providing a result screen that is displayed when the monitoring targets of the one or more other monitoring apparatuses were changed to the monitoring targets of the monitoring apparatus;

transmitting, to the management server, a notification of information on the one or more other monitoring apparatuses whose monitoring target was changed and of the type information of the monitoring apparatus;

collecting, after the notification, operation information on the one or more apparatuses from among the plurality of apparatuses that were separated as monitoring targets of the monitoring apparatus; and transmitting the collected operation information to the management server, wherein the result screen displays at least one of a result of the change of the monitoring apparatus that performs monitoring, information on the changed monitoring apparatus, information on a monitoring target apparatus that can no longer be monitored, and a reason why the monitoring target apparatus can no longer be monitored, and wherein the confirmation screen further includes notification information indicating a recommendation of further migration processing using another monitoring apparatus for apparatuses that have not been separated as the monitoring targets by the separation processing.

9. A non-transitory computer-readable medium storing a program for causing a monitoring apparatus that is placed in a site network including a plurality of apparatuses to:

accept an input of identification information on one or more other monitoring apparatuses that were previously placed on the site network and were monitoring the plurality of apparatuses;

transmit a request including the input identification information to a management server;

receive, as a response to the request, type information on the one or more other monitoring apparatuses from the management server;

determine whether or not the received type information matches type information of the monitoring apparatus;

separating, if it is determined that the received type information does not match the type information of the monitoring apparatus, one or more apparatuses, as monitoring targets of the monitoring apparatus, from among the plurality of apparatuses, wherein the plurality of apparatuses were being monitored by the one or more other monitoring apparatuses;

providing a confirmation screen that displays, when the one or more apparatus, which were monitored by the one or more other monitoring apparatuses, are changed to the monitoring targets of the monitoring apparatus by the separation processing, information of apparatuses that have not been separated as the monitoring targets of the monitoring apparatus by the separation processing;

provide a result screen that is displayed when the monitoring targets of the one or more other monitoring apparatuses were changed to the monitoring targets of the monitoring apparatus;

transmit, to the management server, a notification of information on the one or more other monitoring apparatuses whose monitoring target was changed and of the type information of the monitoring apparatus;

collect, after the notification, operation information on the one or more apparatuses from among the plurality of apparatuses that were separated as monitoring targets of the computer; and transmit the collected operation information to the management server, wherein the result screen displays at least one of a result of the change of the monitoring apparatus that performs monitoring, information on the changed monitoring apparatus, information on a monitoring target apparatus that can no longer be monitored, and a reason why the monitoring target apparatus can no longer be monitored, and wherein the confirmation screen further includes notification information indicating a recommendation of further migration processing using another monitoring apparatus for apparatuses that have not been separated as the monitoring targets by the separation processing.

* * * * *